(12) United States Patent
Elikhis et al.

(10) Patent No.: US 9,832,402 B2
(45) Date of Patent: Nov. 28, 2017

(54) ROW AND COLUMN NOISE CORRECTION WITH DEFECTIVE PIXEL PROCESSING

(71) Applicant: Sony Semiconductor Solutions Corporation, Kanagawa (JP)

(72) Inventors: Edward Elikhis, Raanana (IL); Ping Wah Wong, Sunnyvale, CA (US)

(73) Assignee: Sony Semiconductor Solutions Corporation, Kanagawa (JP)

( * ) Notice: Subject to any disclaimer, the term of this patent is extended or adjusted under 35 U.S.C. 154(b) by 41 days.

(21) Appl. No.: 14/927,086

(22) Filed: Oct. 29, 2015

(65) Prior Publication Data
US 2017/0126999 A1    May 4, 2017

(51) Int. Cl.
*H04N 5/367* (2011.01)

(52) U.S. Cl.
CPC .................................. *H04N 5/367* (2013.01)

(58) Field of Classification Search
CPC ...................................................... H04N 5/367
See application file for complete search history.

(56) References Cited

U.S. PATENT DOCUMENTS

| | | | | |
|---|---|---|---|---|
| 7,508,975 B2 * | 3/2009 | Izumi | ...................... | H04N 5/367 348/245 |
| 8,411,175 B2 * | 4/2013 | Sato | ...................... | H04N 5/3675 348/241 |
| 8,451,350 B2 * | 5/2013 | Nozaki | .................. | H04N 5/361 348/243 |
| 2008/0298716 A1 * | 12/2008 | Yamagata | ............ | H04N 5/3675 382/275 |
| 2014/0354862 A1 * | 12/2014 | Inoue | ................... | H04N 5/3572 348/243 |
| 2015/0070536 A1 * | 3/2015 | Sasaki | .................... | H04N 5/367 348/246 |

* cited by examiner

*Primary Examiner* — Padma Haliyur
(74) *Attorney, Agent, or Firm* — Michael Best & Friedrich LLP

(57) ABSTRACT

Row and column noise calibration and correction includes obtaining pixel values from a row/column of calibration pixels and from a corresponding row/column of bright pixels. Defective calibration pixels are detected based on the pixel values of the row/column of calibration pixels. For example, calibration pixels with pixel values outside a predetermined range may be detected as defective. The pixel values of defective calibration pixels may be removed from the pixel data, or a corrected pixel value substituted in lieu thereof. An average of the pixel values of the row/column of calibration pixels is used to correct the pixel values of the corresponding row/column of bright pixels.

22 Claims, 21 Drawing Sheets

Image with row noise

Image with Row noise corrected based on OB columns without bad pixels

Image with row noise corrected based on OB columns with bad pixels, in which bad pixel detection/correction was performed

ROW AND COLUMN NOISE CORRECTION WITH DEFECTIVE PIXEL PROCESSING

BACKGROUND

1. Field of the Invention

The present invention relates generally to a noise correction in an image sensor, and more particularly to row and/or column noise calibration and removal in image sensor 100 chips.

2. Description of the Related Art

An image sensor typically comprises an array of photosensitive elements, which are often called pixels. The pixels are exposed to light under the control of various timing and/or control circuits. To reduce noise in the system, many image sensor designs use the method of correlated double sampling (CDS). In CDS, the photosensitive elements are first reset, and the reset signal of each pixel is read from the array. This is usually referred to as the reset value, P-phase value, or cds value. The array is then exposed to light and the light exposed value of each pixel is read. This is usually referred to as the light exposed value, D-phase value, or data value. The cds value of each pixel is then subtracted from the data value of the same pixel to produce the output value of the pixel. For image sensors that do not use CDS, only the light exposed values are read from the pixels to produce the output.

While the CDS method is effective in reducing or removing the noise due to the pixels, it does not remove noise in the other circuit elements in the sensor such as the readout circuit, the sample-and-hold, the analog-to-digital converter, etc. In particular, noise is added to the image signal that is outputted from the image sensor 100 during the read out process, and this noise introduces unwanted artifacts that degrade image quality and lead to visible image defects.

It is important to distinguish between temporal noise and fixed pattern noise. While both types of noise can be reduced or removed using methods of calibration, correction and/or filtering, the method that works for mitigating one type of noise may not work for mitigating the other type of noise. Generally fixed pattern noise can be mitigated using a calibration method prior to an imaging operation—for example, during power up of the image sensor—and the results of the calibration can be stored and used later during imaging to correct the pixel data.

However, this approach of performing calibration in advance of imaging and subsequently using stored calibration values cannot be effectively used to mitigate noise that is temporal in nature. Instead, effective mitigation of temporal noise may require performing noise mitigation processes repeatedly during operation of the image sensor, since the noise may vary with time.

Various approaches to compensating for fixed pattern and temporal noise involve providing special means for measuring the noise and then generating values that are used to compensate for the noise. For example, U.S. Pat. No. 6,433,822 discloses an image sensor including a calibration reference circuit and calibration logic, which together produce and store a reference signal for each column that is later subtracted from pixel data that has been read out to produce corrected data. U.S. Pat. No. 8,237,824 corrects fixed pattern noise by generating a per-pixel calibration model for each pixel in the sensor array using measurements under a plurality of illumination levels; the model is then used for correcting the output pixel values in image capture. U.S. Pat. No. 6,438,695 uses a set of calibration pixels (which are different from the actual pixels) to capture image data, injects reference voltages into the calibration pixels to measure the characteristics of the circuit readout elements (e.g. the bitlines) and generates calibration data based on the measurements, which is used to correct the actual image pixels. U.S. Pat. No. 8,817,120 and US patent application 2013/0321671A1 collects statistics from a frame of data (image frame) and determines correction factors (such as gain and offset values) based on the statistics for the purpose of correcting the rows and columns.

SUMMARY

As with any pixels, there may be defects in the pixels from which signals are read out as part of a calibration operation for mitigating temporal or fixed pattern noise. These defective pixels produce incorrect output values, which can produce erroneous calibration data. The present disclosure solves these and other problems, as discussed in greater detail below.

According to a first exemplary illustration of the subject matter of the present disclosure, an image sensor may include a pixel array including bright pixels and optical dark pixels, and a noise correction circuit. The noise correction circuit may include a defective pixel detection and correction circuit configured to detect a defective optical dark pixel, and to modify pixel data for a group of optical dark pixels based on the detection of the defective optical dark pixel; an averaging circuit configured to compute an average of the modified pixel data for the group of optical dark pixels; and an adder configured to subtract the average from the pixel value of each of the bright pixels in a group corresponding to the group of optical dark pixels.

According to the first exemplary illustration, the modifying of the pixel data for the group of optical dark pixels based on the detection of the defective pixel may include removing the pixel value of the defective pixel from the pixel data for the group of optical dark pixels.

According to the first exemplary illustration, the modifying of the pixel data for the group of optical dark pixels based on the detection of the defective pixel may include correcting the pixel value of the defective pixel in the pixel data for the group of optical dark pixels.

According to the first exemplary illustration, the defective pixel detection and correction circuit may be configured to detect as a defective optical dark pixel any optical dark pixel whose pixel value is one the top MH pixel values or one of the bottom ML pixel values in the pixel data for the group of optical dark pixels, where MH and ML are predetermined values.

According to the first exemplary illustration, the defective pixel detection and correction circuit may be configured to detect as a defective optical dark pixel any optical dark pixel whose pixel value is outside a predetermined range.

According to the first exemplary illustration, the defective pixel detection and correction circuit may be configured to detect as a defective optical dark pixel any optical dark pixel having at least a predetermined number of neighboring optical dark pixels that are defective.

According to the first exemplary illustration, the group of optical dark pixels may comprise a row of optical dark pixels and the group of bright pixel corresponding to the group of optical dark pixels may comprise a row of bright pixels. In addition, pixel values of the row of optical dark pixels and pixel values of the corresponding row of bright pixels may be read out from the pixel array at the same time.

According to the first exemplary illustration, the group of optical dark pixels may comprise a column of optical dark pixels and the group of bright pixel corresponding to the group of optical dark pixels may comprise a column of bright pixels. In addition, pixel values of the column of optical dark pixels and pixel values of the corresponding column of bright pixels may be read out from the pixel array through a same analog-to-digital converter.

BRIEF DESCRIPTION OF THE DRAWINGS

These and other more detailed and specific features of the present invention are more fully disclosed in the following specification, reference being had to the accompanying drawings, in which:

FIG. 11 includes conceptual diagrams illustrating exemplary process flows for row/column noise calibration and correction including defective pixel detection.

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

The present disclosure is related to correction of row and/or column noise in an image sensor. Row and column noises can appear in the final output image as horizontal or vertical stripes.

Figure 18:
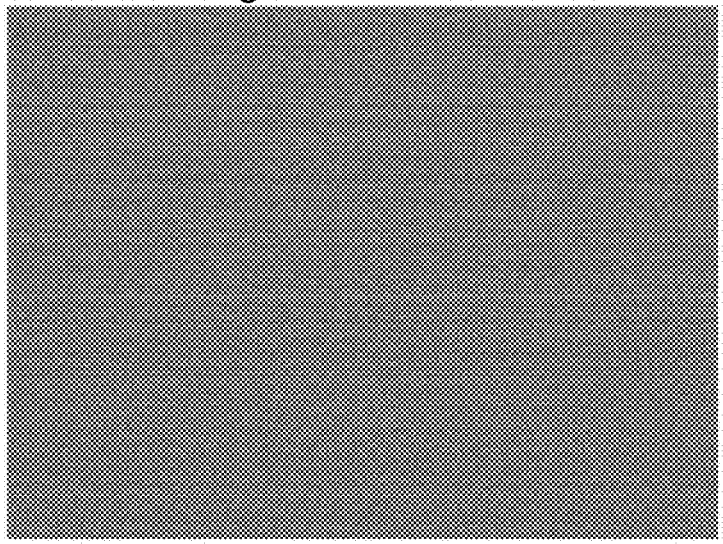
FIG. 18 illustrates an image with row noise.

The main source of the row noise is introduced during data ADC conversion stage and has roots in noise associated with the reference bias. This noise is usually both temporal and fixed pattern in nature; it is the same for all pixels that passed through ADC conversion at the current time moment. Usually these pixels relate to the same image row (or portion thereof) so this nose is visible as row strips in the image. FIG. 18. shows an example of such an effect.

In the case of column noise, it can arise from the mechanism of adding a voltage and/or current offset to the pixel values to bring the readout circuitry to the optimal working conditions. Although the added offset is intended to be uniform for all readout circuits in the design, the offset varies in practice due to the effects of noise and circuit imperfections. In the case of a column-parallel ADC architecture this offset has temporal and fix pattern variation and changes from column to column. This effect is visible on the images as vertical stripes.

The row and column noises can be fixed pattern noise (i.e., does not change from frame to frame) or temporal noise (changes from frame to frame), and the processes and apparatuses disclosed herein are effective at reducing both of these types of noise.

Referring to FIGS. 5-8, an approach to correcting such row and/or column noise (discussed in greater detail below) is to use pixels 105B in area 110B (also referred to herein as "Calibration pixels" or "optical dark pixels") to obtain calibration data, and then to correct pixels 105A in area 110A (which are the pixels used in imaging a scene) based on the calibration data.

However, there may be defects in one or more of the pixels 105B, and the defective pixels 105B will produce incorrect output values. Examples are pixels 105B that are stuck high (always produce a high output value), stuck low (always produce a low output value), or particularly noisy (produces much larger fluctuations compared to normal pixels). Such defective pixels 105B can severely distort the statistics used in the noise calibration and correction procedures, and thereby produce erroneous calibration data, which results in degraded image quality.

Thus, the present disclosure provides methods and apparatuses for detection of defective pixels 105B in association with a row/column noise calibration and correction process. If a pixel 105B is determined to be defective, it is rejected from the calibration procedure and hence it would not distort the row or column statistics. Alternatively, the defective pixel 105B is corrected, instead of rejected, so that the pixel 105B can still be used in the row/column noise calibration and correction process in a way that would not distort the statistics. Thus, the present disclosure improves the accuracy of the compensation process and removes visual image artifacts.

[Configuration of Image Sensor]

Figure 1:
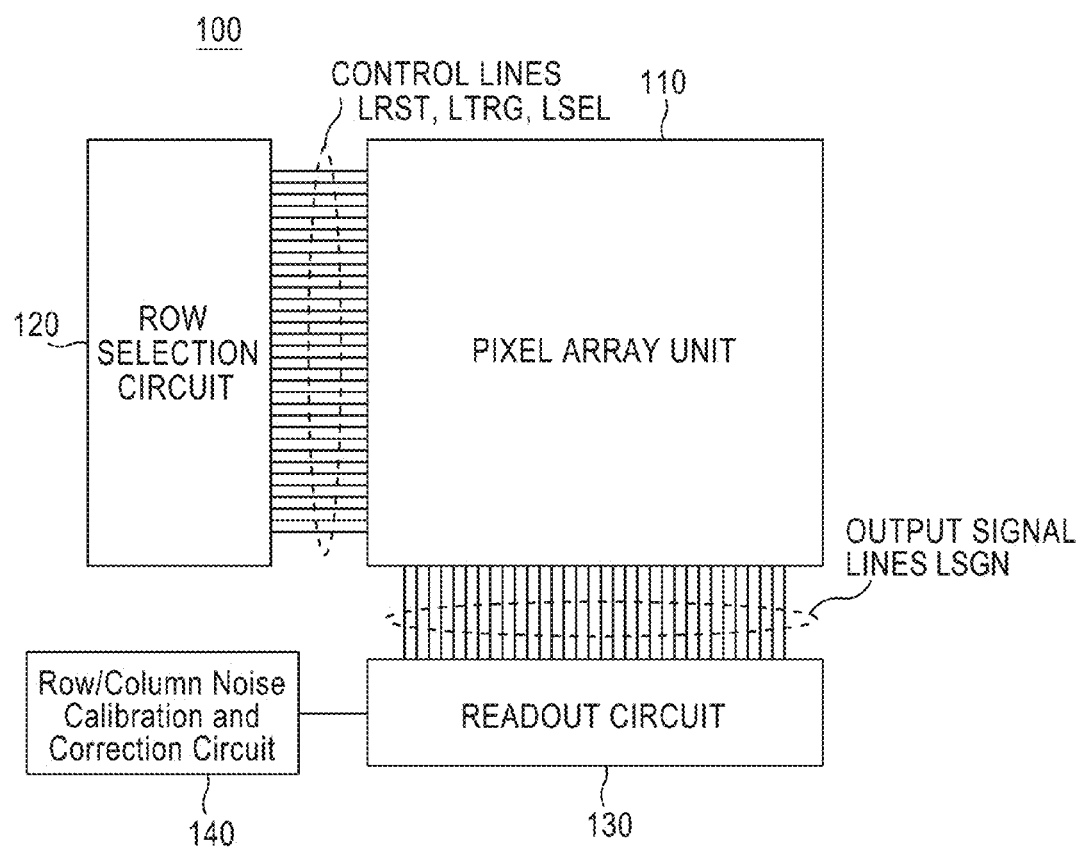
FIG. 1 is a conceptual diagram illustrating an exemplary image sensor 100.

FIG. 1 illustrates an exemplary image sensor 100. The image sensor 100 includes a pixel array 110, a row selection circuit 120, control lines (e.g., LRST LTRG, LSEL), a readout circuit 130, output signal lines LSGN, and a Row/Column Noise Calibration and Correction Circuit 140 (hereinafter, "Calibration and Correction Circuit 140"). The pixel array 110 includes multiple pixels 105 arrayed in any arbitrary pattern (not illustrated). The row selection circuit 120 may apply control signals to the control lines and thereby control operations of the pixels 105.

The image sensor 100 images a scene by exposing the pixel array 110 to light from the scene during an exposure period. Pixel signal values may be read out from the pixels 105 to the readout circuit 130 through the output signal lines LSGN. The readout circuit 130 may perform various types of signal processing on the pixel signal values, such as error correction, correlated double sampling, and analog-to-digital conversion, and then the output pixel data are obtained based on the processed pixel signal values.

The pixel data is output by the readout circuit 130 to the Calibration and Correction Circuit 140. In addition, the pixel data may be output by the readout circuit 130 to other components via different output paths (not shown). The pixel data is subjected to row and/or column calibration and correction processing by the Calibration and Correction Circuit 140, and the corrected pixel values may be output by the Calibration and Correction Circuit 140 for subsequent processing or storage. In some embodiments, the raw data that is later combined by an image signal processor to form an image is the pixel data as corrected by the Calibration and Correction Circuit 140. In other embodiments, the pixel values prior to being corrected by the Calibration and Correction Circuit 140 may constitute the raw data, and may be stored separately from the corrected pixel values. The Calibration and Correction Circuit 140 will be discussed in greater detail below.

In one embodiment, the pixels 105 are arrayed in a pattern comprising a matrix of rows and columns, the pixels 105 are controlled in units of a row (i.e., an entire row of pixels 105 is selected at the same time), the pixels 105 are read out row-sequentially, and each signal line LSGN corresponds to one column of the pixel array 110. However, other patterns of arraying the pixels, other scanning methods, and other signal line configurations are all possible. For example, the pixels 105 may be divided into arbitrary groups that each share a signal line LSGN, each Bayer quadrant may share a signal line LSGN, each predetermined area of the pixel array may share a signal line LSGN, multiple columns may share a signal line LSGN, and so on. The image sensor 100 may also have an architecture in which multiple elements share certain circuits. For example, the image sensor 100 may have a column ADC architecture in which all pixels 105 in the same column share the same analog-to-digital converter (ADC). Other exemplary architectures that the image sensor 100 may use include: a block architecture, in which each K×L block of pixels 105 shares the same ADC; column shared architecture, in which pixels 105 in Q columns share the same ADC; an architecture in which each column is divided into P segments and each segment of pixels 105 shares the same ADC, etc. Indeed, any arbitrary pattern of arraying the pixels, any arbitrary scanning method, and any arbitrary signal line arrangement may be used. If an arrangement different than the exemplary arrangement described herein is used, the processes described below may still be applied. For example, by substituting for "row" in the description below whatever unit of pixels is simultaneously selected for a readout operation in the architecture and by substituting for "column" in the description below whatever output-processing arrangement is used in the architecture.

The pixel array 110 may include a first set of pixels 105A whose output values are not used to measure noise in the calibration processes described below (aka regular pixels, bright pixels, or imaging pixels), and a second set of pixels 105B whose output signals are used to measure noise in the calibration processes described below (aka calibration pixels or optical dark pixels). In some embodiments, the first set of pixels 105A are dedicated to imaging the scene while the second set of pixels 105B includes pixels dedicated solely to the calibration processes (i.e., when a scene is imaged, the output signals of the pixels 105B are not included in the output image data). In other embodiments, some or all of the pixels 105B may also be used for imaging processes in addition to the calibration processes.

The pixels 105B that are used for calibration processes may be optical black pixels (OPB) 105, which are kept from receiving incident light during the exposure period. One possible advantage of having at least some of the pixels 105B that are used for the calibration process be optical black pixels 105B, is that doing so reduces the influence of the ambient light on the calibration processes. In some embodiments, all of the pixels 105B that are used for the calibration processes are optical black.

For example, the pixel array 110 may include a bright area 110A and an optical black area 110B, with those pixels 105A that are used for imaging the scene being located in the bright area 110A, while those pixels 105B that are located in the optical black area 110B are prevented from receiving incident light during the exposure period. For example, a light shielding material may be disposed over the pixels 105B in the optical black area 110B to prevent incident light from reaching them.

When an optical black area 110B is included, the optical black area 110B may be arranged relative to the bright area 110A in a number of ways. Generally for the purpose of calibrating, and hence correcting, for row noise, it may be desirable to have OPB pixels 105B on at least one of the left side or right side of the bright area 110A, with rows of OPB pixels 105B being arranged adjacent to their corresponding rows of bright pixels 105A. These OPB pixels 105B arranged on the left and/or right side of the bright area 110A may span from the top to the bottom of the bright area 110A, and therefore may be referred to as optical dark columns or optical black columns. Hence optical black columns are used for row noise calibration and correction. Similarly for the purpose of calibration and correcting for column noise, it may be desirable to have OPB pixels 105B on at least one of the top or the bottom of the bright area 110A, with columns of OPB pixels 105B arranged adjacent to their corresponding columns of bright pixels 105A. These OPB pixels 105B on the top and/or bottom may span from the left to the right of the bright area 110A, and as a result may be referred to as optical dark rows or optical black rows. Hence optical black rows are used for column noise calibration and correction.

Figure 2:
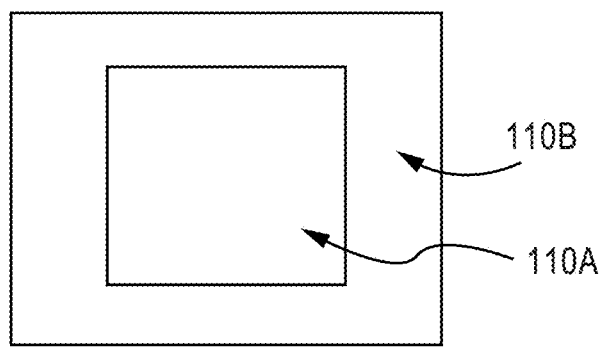
FIG. 2 is a conceptual diagram illustrating an exemplary pixel array 110 with optical black areas 110B surrounding the illuminated area 110A.

FIG. 2 illustrates an exemplary image sensor 100 with optical black area 110B surrounding the optical bright region 110A on all sides. Each row and each column in the bright area 110A has its own corresponding optical black row/column in the optical black area 110B. The rows and columns of the optical dark area 110B may preferably be disposed in close proximity to their corresponding rows and columns from the bright area 110A. Such architecture may be used for correcting both row and column noise. The circuit can be arranged so that, when a bright area row of pixels 105A is selected, the optical black pixels 105B from the optical black row corresponding to the selected bright row pass through the ADC conversation process simultaneously with the optical bright pixels 105A of the selected bright row. Thus, the pixels 105B in the optical black row would have the same temporal row noise component as the pixels 105A in the corresponding bright row, and therefore the output of the pixels 105B may be used in the row noise calibration and compensation process to correct the pixels 105A from the corresponding bright row. In the example of an image sensor 100 with a column ADC architecture, pixels 105A and 105B in the same column share the same ADC and S/H (not illustrated). If each optical black column also shared the same ADC and S/H as its corresponding bright column, then the pixels 105A and 105B that are in the same column would have the same temporal column noise component (e.g., noise from the ADC and S/H). In this case, the output of the pixels 105B in an optical dark column may be used in the column noise calibration and compensation process to correct the pixels 105A from the corresponding bright column.

Figure 3:
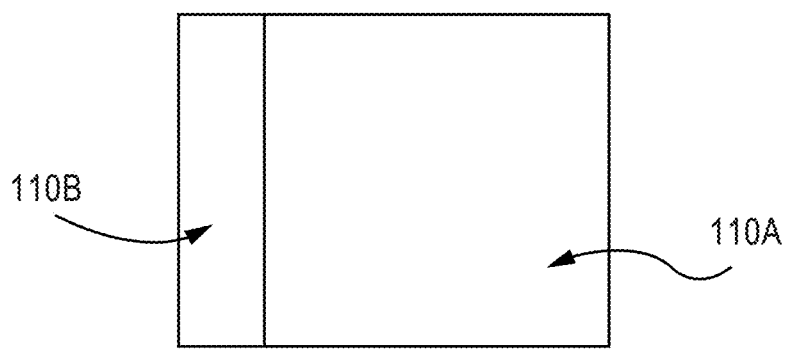
FIG. 3 is a conceptual diagram illustrating an exemplary pixel array 110 with an optical black area 110B on the left side of illuminated area 110A.

FIG. 3 illustrates an exemplary image sensor 100 with optical black area 110B only on the left side of the optical bright region 110A. Row noise calibration and correction in this example are similar to that described with respect to the example of FIG. 2. However, because in this example there is no optical black area 110B either on the top or the bottom of the bright area 110A for column noise calibration, only row noise calibration and compensation are performed in this example.

Figure 4:
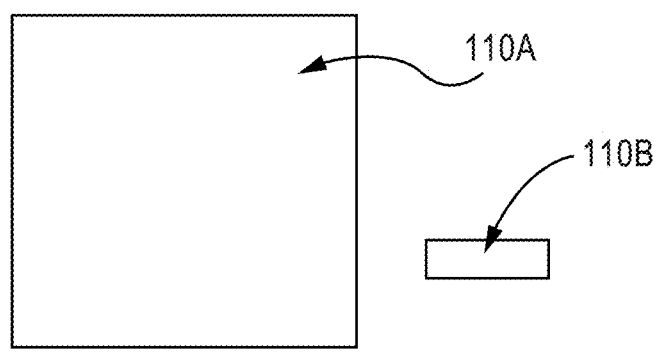
FIG. 4 is a conceptual diagram illustrating an exemplary pixel array 110 with optical black area 110B separated from the bright area 110A.

FIG. 4 illustrates an exemplary image sensor 100 with an optical black area 110B which is arranged such that its layout area does not correspond to one of the sides of the optical bright area 110A. In addition to the optical black area 110B being located in an area not corresponding to a side of the bright area 110A, the optical black area 110B may also include less rows of pixels 105B than there are rows of pixels 105A in the bright area 110A, and/or less columns of pixels 105B than there are columns of pixels 105A in the bright area 110A. In particular, there may be only one (or very few) rows of pixels 105B provided in the optical black areas 110B in the example of FIG. 4. This results in reducing the area required for optical black pixels 105B. The read out process is organized such that a single row of optical black pixels 105B corresponds to multiple rows of pixels 105A in the bright area 110A. Thus, the readout of a single row of optical black pixels 105B may be used to correct multiple rows of pixels 105A in the row noise calibration and correction procedure.

The configurations of optical black areas 110B with respect to the bright area 110A discussed above are merely exemplary, and other possible configurations may be used.

In addition, the pixels 105B may include real photodiodes or dummy photodiodes. A real photodiode 111 is one that is electrically connected to the floating diffusion FD in the same manner as the photodiode 111 of the pixels 105A, whereas a dummy photodiode 111 is one that, although otherwise structurally similar to the photodiode 111 of the pixels 105A, is not electrically connected to the floating diffusion. All of the pixels 105B may have real photodiodes 111, all may have dummy photodiodes 111, or some of the pixels 105B in the sensor have real photodiodes 111 while some have dummy photodiodes 111. One potential advantage of using at least some dummy photodiodes 111 is that doing so reduces the influence of dark current on the output signal and hence improves the quality of the calibration data.

Figure 5:
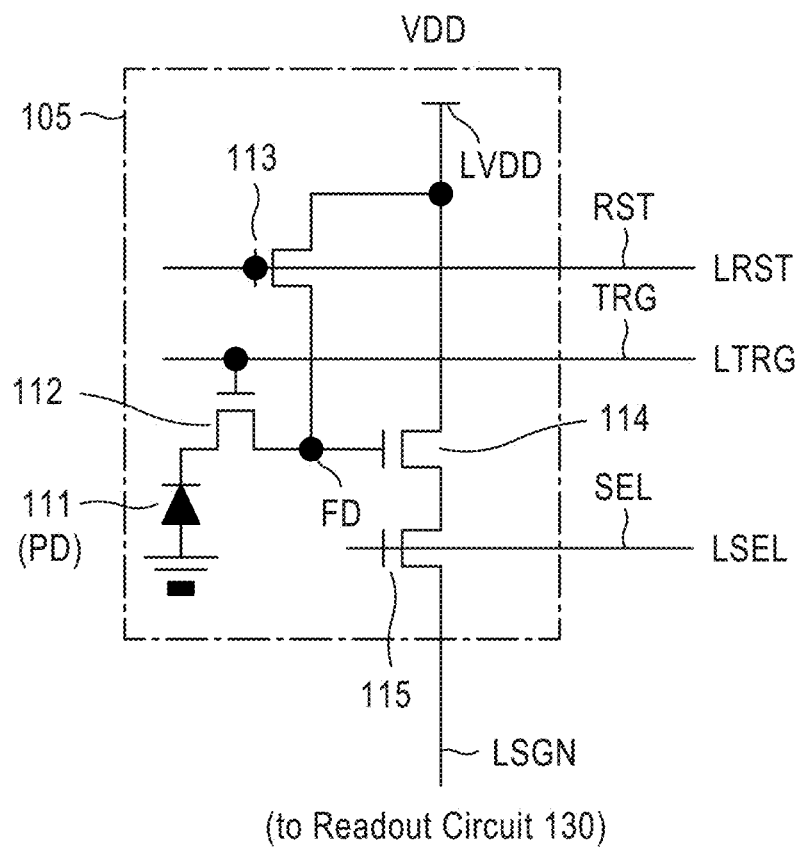
FIG. 5 is a circuit diagram illustrating an exemplary pixel 105.

FIG. 5 illustrates an exemplary configuration of a pixel 105. The pixel 105 may include, for example, a photodiode ("PD") 111, a transfer transistor 112, a floating diffusion ("FD"), a reset transistor 113, a source follower transistor 114, and a readout transistor 115. When the pixel 105 is a pixel 105A in the bright area 110A, the PD converts light into charge during the exposure period, with the amount of charge that is produced being based on the amount of light incidence on the PD during the exposure period (as well as on various sources of noise, such as thermal noise, leakage from adjacent components, etc.). When the pixel 105 is a pixel 105B in the optical dark area 110B, the PD will not receive incident light, and hence will not convert any light to charge (although some charge may be accumulated in the PD due to various noise sources). A reset operation, which is described below, may be completed prior to a start of the exposure period. A mechanical shutter operation may begin the exposure period, or the exposure period may begin with an electronic shutter operation (for example, the ending of the reset operation may begin the exposure period). At the end of the exposure period, the charge is transferred to the FD via the transfer transistor 112 under control of a signal TRG applied to the control line LTRG. The FD integrates the charge into a voltage, which is applied to the gate of the source follower transistor 114. When the readout transistor 115 is turned on by the control signal SEL applied to the control line LSEL, a signal from the source follower transistor 114 is applied to the output signal line LSGN. The signal from the source follower transistor 114 is based on the voltage held in the FD, which in turn is based on the amount of charge that was converted by the PD, which is based on the amount of light incident on the PD during the exposure period. Thus, the signal read out to the signal line LSGN (a pixel signal value) is indicative of an amount of light incident on the PD during the exposure period (plus some noise). The pixel signal values read out to the output signal lines LSGN are read into the readout circuit 130 in parallel, from whence they are read out serially or in parallel as pixel data. After the pixel signal value of the pixel 105 is read out, the aforementioned reset operation may be performed again to reset the pixel for a next exposure period (i.e., a next image frame if the imaging device is capturing video images). The reset operation comprises turning on the reset transistor 113 and the transfer transistor 112 by the control signals RST and TRG, respectively, and thereby clearing out any accumulated charges in the FD and the PD. In addition, a signal (i.e., a reset signal) may be read out from the pixel 105 after performing the reset operation but before charges from the PD are transferred to the FD. This reset signal indicates a reset potential of the FD, and can be used in noise cancellation techniques, such as correlated double sampling.

The above-described pixel 105 is merely exemplary, and it will be understood that various components could be added to, removed from, or rearranged within the pixel 105 as described, and that operations other than those described above could be performed. For example, fewer or additional transistors could be included in the pixel 105. In addition, additional storage elements may be included in the pixel 105, for example to facilitate electronic global shutter operations. As another example, multiple PDs may share a single FD, amplifier transistor 113, and readout transistor 115.

As noted above, the present disclosure involves detecting defective pixels 105B in association with a noise calibration and correction procedure. Below, the noise calibration and correction procedure will first be explained in general, and then the process of detecting defective pixels 105B will be explained.

[Noise Calibration and Correction]

Figure 6:
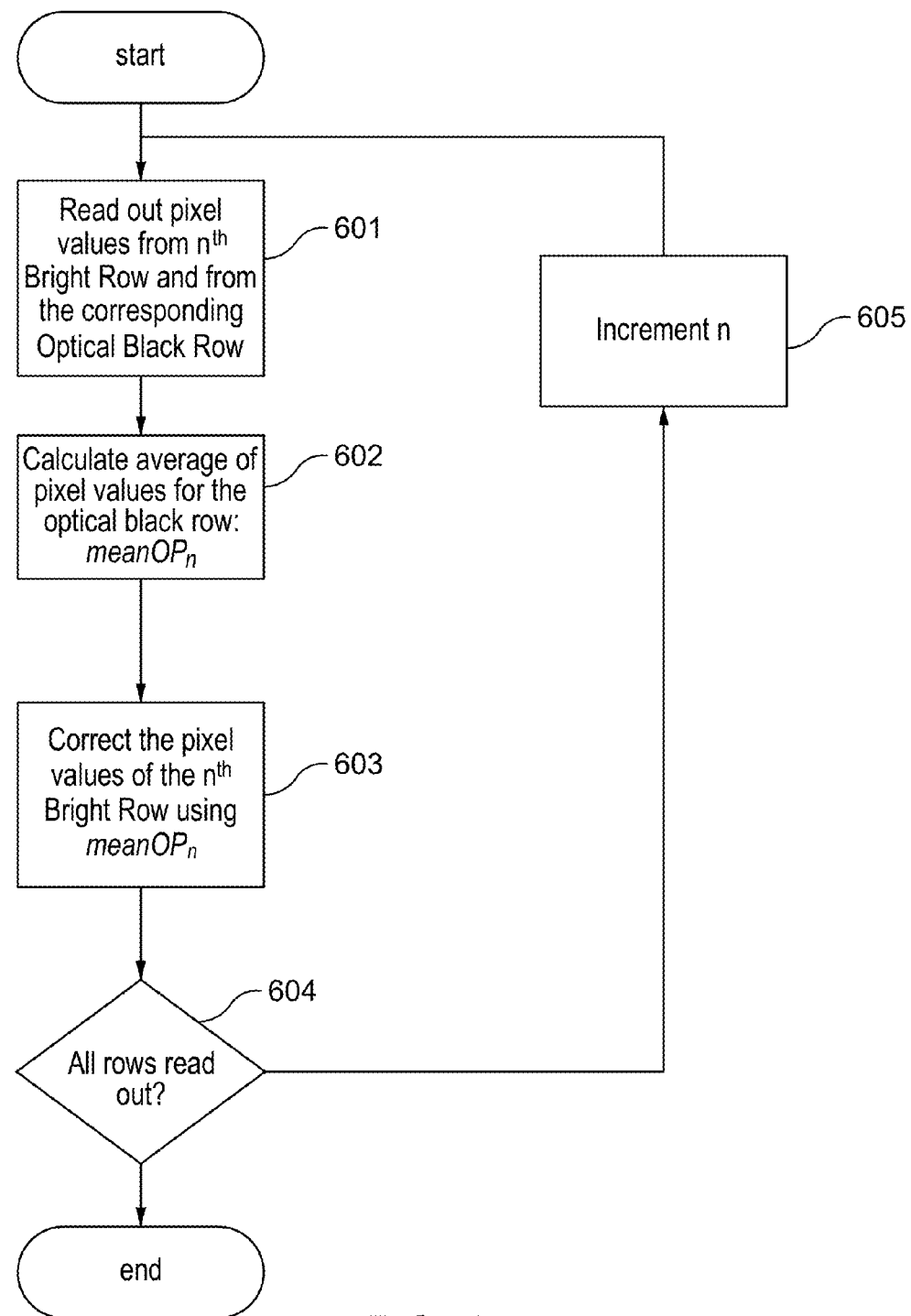
FIG. 6 is a flow chart illustrating an exemplary row noise calibration and correction process.

FIG. 6 illustrates an exemplary row noise calibration and compensation process. In step 601, pixel values from pixels 105A in an $n^{th}$ bright row are read out, and pixel values from pixels 105B in the corresponding optical black row are also read out. For example, in an architecture such as that illustrated in FIGS. 2 and 3, the $n^{th}$ optical black row may correspond to the $n^{th}$ bright row. As another example, in an architecture such as that illustrated in FIG. 4, a single optical black row may correspond to many bright rows (and hence the values of any given optical black row may be used to correct the values of multiple bright rows). The reading out of the pixel values may include passing the values through AD conversion.

In step 602, an average of the pixel values of the optical dark row corresponding to the $n^{th}$ bright row is determined. This value is referred to as meanOB$_n$ in FIG. 6.

In step 603, the pixel values of the $n^{th}$ bright row are corrected using mean OB$_n$.

In step 604, it is determined whether every row of bright pixels 105A has been read out. If so, the process ends. If not, then the process proceeds to step 605, in which n is incremented, and then the process repeats until all rows have been read out.

Although FIG. 6 illustrates steps 602 and 603 being performed for the $n^{th}$ row before a next row is read out, this is merely exemplary and different orders of operations could be used. For example, each bright row and its corresponding optical black row in the entire pixel array 110 may be read out and the pixel values thereof stored, and then after the entire array is read out steps 602 and 603 could be performed for each row, either sequentially row-by-row or in parallel processes. As another example, steps 602 and 603 for the $n^{th}$ row may be performed while a readout of the $(n+1)^{th}$ row is underway.

The correction of the pixel values of the bright pixels 105A will now be described. The pixel values read out from the pixels 105A and 105B can be modelled by the following equations:

$$\text{Signal\_Calib}(i,j) = \text{PixelNoise}(i,j) + \text{RowNoise\_Calib}(i) \quad \text{(eq. 1)}$$

$$\text{Signal\_Image}(i,k) = \text{LDValue}(i,k) + \text{PixelNoise}(i,k) + \text{RowNoise\_Image}(i) \quad \text{(eq. 2)}$$

where i is an index indicating the bright row that is being read out, j is an index indicating a column in the optical black area 110B, k is an index indicating a column in the bright area 110A, Signal_Calib(i,j) is the pixel value output by the $j^{th}$ pixel 105B in the optical black row corresponding to the $i^{th}$ bright row, PixelNoise(i,j) is pixel noise of the $j^{th}$ pixel 105B in the optical black row corresponding to the $i^{th}$ bright row, RowNoise_Calib(i) is row noise of the optical black row corresponding to the $i^{th}$ bright row, Signal_Image (i,k) is the pixel value output by the $k^{th}$ pixel 105A in the $i^{th}$ bright row, PixelNoise(i,k) is pixel noise of the $k^{th}$ pixel 105A in the $i^{th}$ bright row, LDValue(i,k) is a light-dependent value of the $k^{th}$ pixel 105A in the $i^{th}$ bright row, and RowNoise_Image(i) is row noise of the $i^{th}$ bright row. As used above, pixel noise refers to all noise related to the individual pixel, which may come from the readout process (e.g., ADC conversion temporal noise and/or fixed pattern noise), or from the pixel itself (e.g., dark current, shot noise, etc.). As used above, row noise refers to noise that occurs during the readout process for all pixels in a row. As used above, light-dependent value refers to the portion of the pixel value attributable to the photoelectric conversion of the incident light—i.e., the value that ideally would be output by the pixel if there were no noise. If the bright area 110A has M×N pixels then k=1, 2, . . . , N and i=1, 2, . . . , M. When there are Z columns of pixels 105B that are used for the calibration process per optical black row, then j=1, 2, . . . , Z.

Because the optical black row and the bright row are read out at the same time, RowNoise_Image(i) should be equal to RowNoise_Calib(i), and hence will be referred to hereinafter simply as RowNoise(i). If a value of RowNoise(i) can be determined, then the row noise in the bright pixels 105A may be corrected by subtracting the value of RowNoise (i) from the pixel values of the pixels 105A. Optionally, a constant offset value can be added to the corrected value for the purpose of controlling the black level of the output image.

To determine the value of RowNoise(i), the mean of the output values of the pixels 105B in the optical black row corresponding to the $i^{th}$ bright row is determined, which is represented by the following equation:

$$\text{mean}_i(\text{Signal\_Calib}(i,j))|_{j=1:Z} = \text{mean}_i(\text{PixelNoise}(i,j))|_{j=1:Z} + \text{RowNoise}(i) \quad \text{(eq. 3)}$$

where the notation $\text{mean}_i(x(i,j))|_{j=1:Z}$ denotes the average of the Z samples of x(i,j) for the $i^{th}$ row, with j varying from 1 to Z. Because the pixel noise is stochastic (independent identically distributed (i.i.d.) random samples) in nature with a mean value of zero and a standard deviation of PixelNoiseStd, the value of $\text{mean}_i(\text{PixelNoise}(i,j))|_{j=1:Z}$ has a standard deviation $\text{stdev}(\text{mean}_i(\text{PixelNoise}(i,j))|_{j=1:Z})$ that approaches zero as the value Z is increased. Hence an image sensor can be designed with a suitable value of Z so that $\text{mean}_i(\text{PixelNoise}(i,j))|_{j=1:Z}$ is close to zero. Thus, the desired accuracy of the row noise correction process may be achieved by setting the number of columns of pixels 105B included in the image sensor 100 so that $\text{stdev}(\text{mean}_i(\text{PixelNoise}(i,j))|_{j=1:Z})$ is smaller than a given design target specification. Assuming that $\text{mean}_i(\text{PixelNoise}(i,j))|_{j=1:Z} = 0$, equation 3 reduces to:

$$\text{mean}_i(\text{Signal\_Calib}(i,j))|_{j=1:Z} = \text{RowNoise}(i) \quad \text{(eq. 4)}$$

Accordingly, the row noise for the $i^{th}$ bright row can be approximated by the mean of the pixel values of the corresponding optical black row (i.e., by $\text{mean}_i(\text{Signal\_Calib}(i,j))|_{j=1:Z}$). Therefore, the pixel values of the $i^{th}$ bright row can have their row noise corrected by subtracting the mean of the pixel values of the corresponding optical black row.

Figure 7:
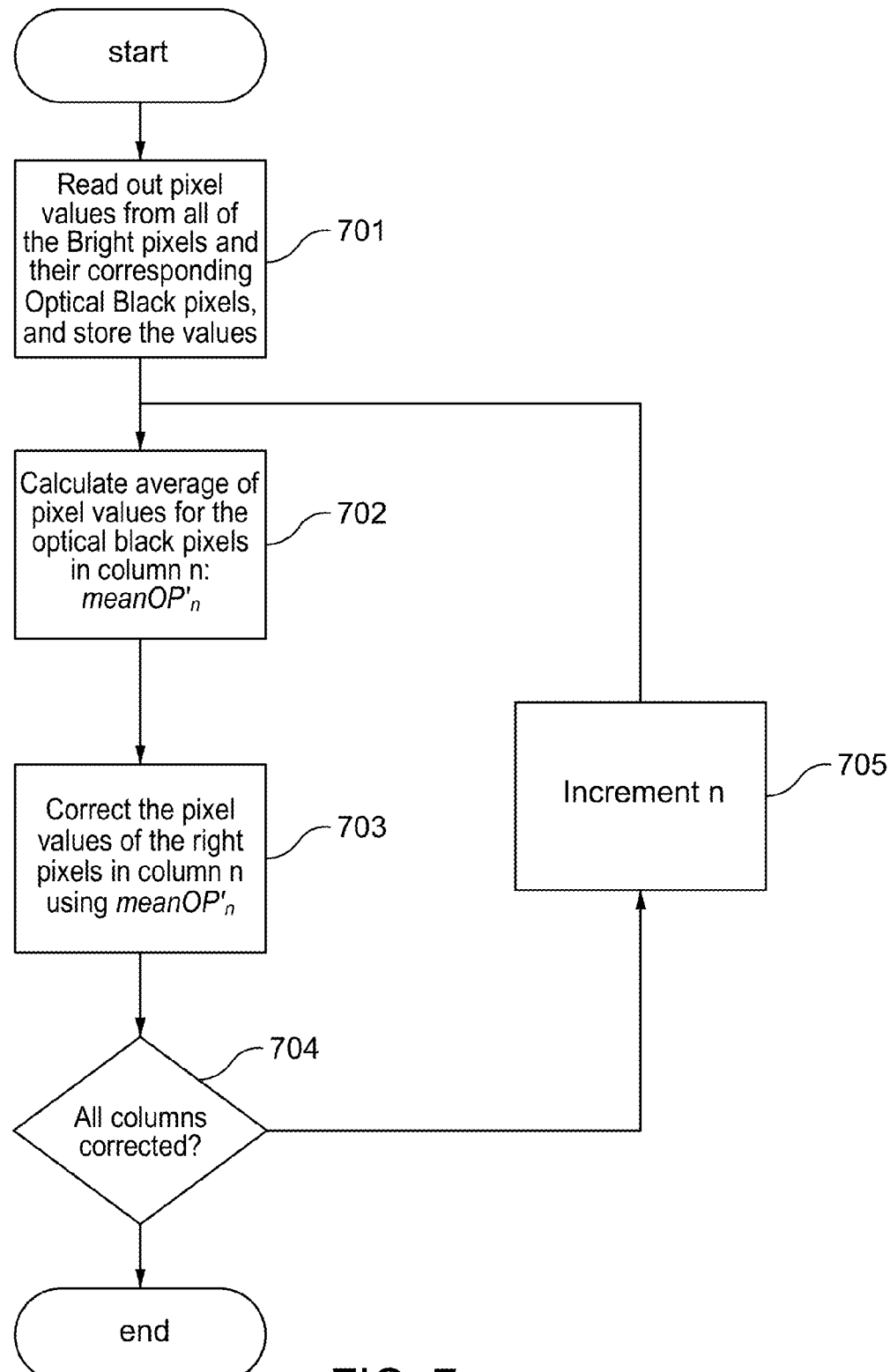
FIG. 7 is a flow chart illustrating an exemplary column noise calibration and correction process.

FIG. 7 illustrates an exemplary column noise calibration and compensation process. In step 701, pixel values from each pixel 105A are read out and stored, and pixel values from those pixels 105B that share the same columns as the pixels 105A are also read out and stored. The reading out may be performed in any order, such as row sequentially, and the reading out of the pixel values may include passing the values through AD conversion.

In step 702, an average of the pixel values of the optical dark column corresponding to the $n^{th}$ bright column is determined. This value is referred to as meanOB'$_n$.

In step 703, the pixel values of the $n^{th}$ bright column are corrected using meanOB'$_n$.

In step 704, it is determined whether every column of bright pixels 105A has been corrected. If so, the process ends. If not, then the process proceeds to step 705, in which n is incremented, and then the process repeats until all bright columns have been corrected.

The column noise correction of the pixel values of the bright pixels 105A will now be described. The pixel values read out from the pixels 105A and 105B can be modelled by the following equations:

$$\text{Signal\_Calib}(l,k) = \text{PixelNoise}(l,k) + \text{ColumnNoise}(k) \quad \text{(eq. 5)}$$

$$\text{Signal\_Image}(i,k) = \text{LDValue}(i,k) + \text{PixelNoise}(i,k) + \text{ColumnNoise}(k) \quad \text{(eq. 6)}$$

where i is an index indicating the bright row, k is an index indicating a column, l is an index indicating an optical black row, Signal_Calib(l,k) is the pixel value output by the $k^{th}$ pixel 105B in the $l^{th}$ optical black row, PixelNoise(l,k) is pixel noise of the $k^{th}$ pixel 105B in the $l^{th}$ optical black row, ColumnNoise(k) is column noise of the $k^{th}$ column, Signal_Image(i,k) is the pixel value output by the $k^{th}$ pixel 105A in the $i^{th}$ bright row, PixelNoise(i,k) is pixel noise of the $k^{th}$ pixel 105A in the $i^{th}$ bright row, and LDValue(i,k) is a light-dependent value of the $k^{th}$ pixel 105A in the $i^{th}$ bright row. As used above, pixel noise refers to all noise related to the individual pixel, which may come from the readout process (e.g., ADC conversion temporal noise and/or fixed pattern noise), or from the pixel itself (e.g., dark current, shot noise, etc.). As used above, column noise refers to noise that occurs during the readout process for all pixels in a column. As used above, light-dependent value refers to the portion of the pixel value attributable to the photoelectric conversion of the incident light—i.e., the value that ideally would be output by the pixel if there were no noise. If the bright area 110A has M×N pixels then k=1, 2, . . . , N and i=1, 2, . . . , M. When there are Y rows of pixels 105B that are used for the calibration process per optical black column, then l=1, 2, . . . , Y.

Because the optical black column and the bright column are read out through the same ADC and S/H, they have approximately equal column noise (i.e., ColumnNoise(k)). If a value of ColumnNoise(k) can be determined, then the column noise in the bright pixels 105A may be corrected by subtracting the value of ColumnNoise(k) from the pixel values of the pixels 105A.

To determine the value of ColumnNoise(k), the mean of the output values of the pixels 105B in the $k^{th}$ column is determined, which is represented by the following equation:

$$\text{mean}_k(\text{Signal\_Calib}(l,k))|_{l=1:Y} = \text{mean}_k(\text{PixelNoise}(l,k))|_{l=1:Y} + \text{ColumnNoise}(k) \quad \text{(eq. 7)}$$

where the notation $\text{mean}_k(x(l,k))|_{l=1:Y}$ denotes the average of the Y samples of x(l,k) for the $k^{th}$ column, with l varying from 1 to Y. Because the pixel noise is stochastic (i.i.d. random samples) in nature with a mean value of zero and a standard deviation of PixelNoiseStd, the value of $\text{mean}_k$(PixelNoise(l,k))$|_{l=1:Y}$ has a standard deviation stdev($\text{mean}_k$(PixelNoise(l,k))$|_{l=1:Y}$) that approaches zero as the value Y is increased. Hence an image sensor can be designed with a suitable value of Y so that $\text{mean}_k$(PixelNoise(l,k))$|_{l=1:Y}$ is close to zero. Thus, the desired accuracy of the column noise correction process may be achieved by setting the number Y so that stdev($\text{mean}_k$(PixelNoise(l,k))$|_{l=1:Y}$) is smaller than a given design target specification. Assuming that $\text{mean}_k$(PixelNoise(l,k))$|_{l=1:Y}$=0, equation 7 reduces to:

$$\text{mean}_k(\text{Signal\_Calib}(l,k))|_{l=1:Y} = \text{ColumnNoise}(k) \quad \text{(eq. 8)}$$

Accordingly, the column noise for the $k^{th}$ bright column can be approximated by the mean of the pixel values of the corresponding optical black column (i.e., by $\text{mean}_k$(Signal_Calib(l,k))$|_{l=1:Y}$). Therefore, the pixel values of the $k^{th}$ bright column can have their column noise corrected by subtracting the mean of the pixel values of the corresponding optical black column.

[Defective Pixel Detection, Exclusion, and Correction]

Figure 13:
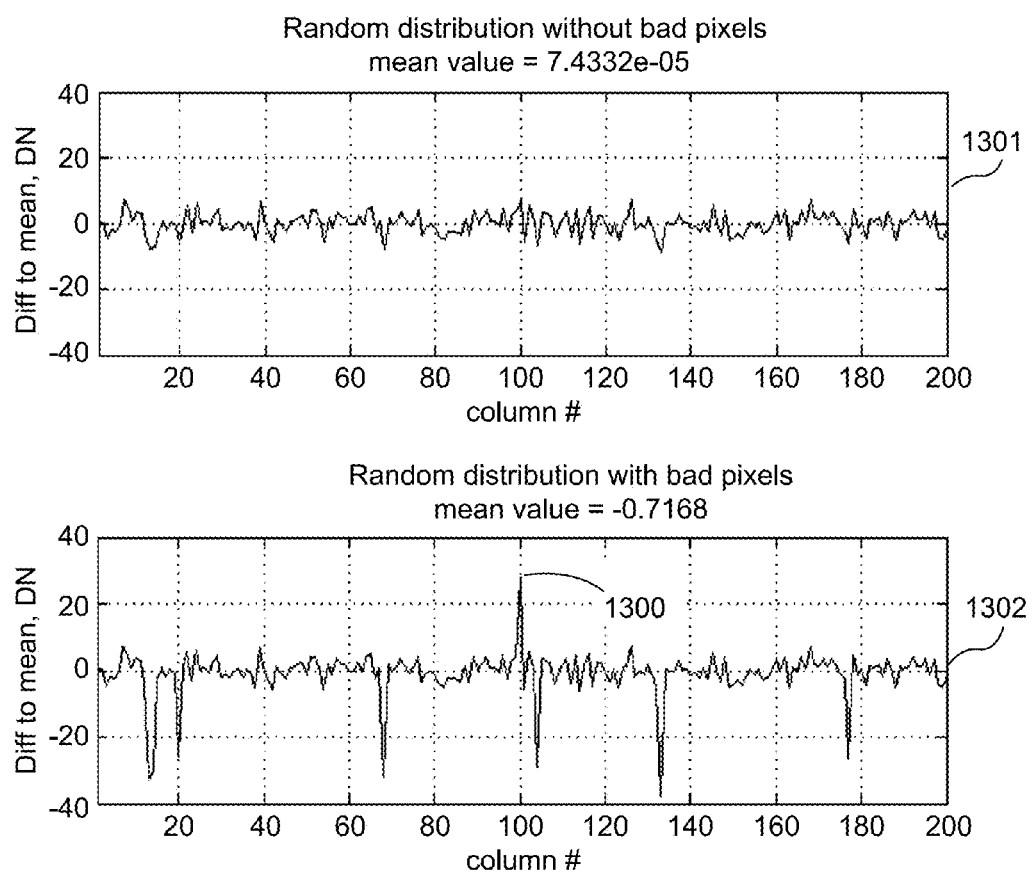
FIG. 13 includes graphs showing a first distribution 1301 of pixel values without defective pixels and a second distribution 1302 with defective pixels.

For practical implementations in actual imagers, the size of the optical black area 110B targeted for row and/or column noise calibration is limited to a finite size. Due to this limitation the numbers Z in Eq. 4 and Y in Eq. 8 are not infinite in value. This means that even a few defective or bad pixels 105B in the calibration area can strongly influence the accuracy of the calculated average. This can be seen in FIG. 13, in which a first set of pixel values 1301 is compared to a second set of pixel values 1302. In the first set of pixel values 1301, there are no apparent defective pixels 105B, while in the second set of pixel values 1302 there are at least seven defective pixels 105B, as indicated by the pixels values 1300 that are highly divergent from the mean. In the case of no apparent defective pixels (first set 1301), the mean of the pixel values equals 7.43e-05, which is very close to the ideal mean value of zero. In the case including defective pixels (second set 1302), the mean of the pixels values equals −0.72, which is a non-negligible deviation from the ideal mean value of zero that will lead to visible artifacts if it is used to correct the pixel values according to the row/column noise correction processes discussed above. Thus, the present disclosure provides methods and apparatuses for detecting and accounting for defective pixels.

Figure 11A:
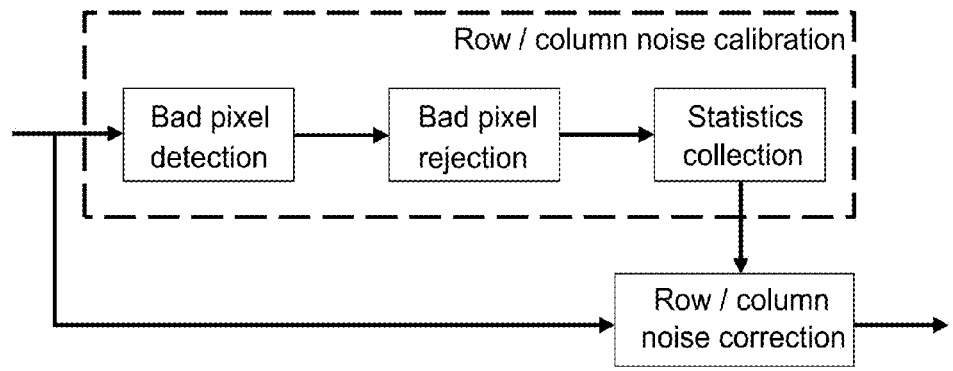
FIG. 11A illustrates a process flow in which defective pixels are rejected.
Figure 11B:
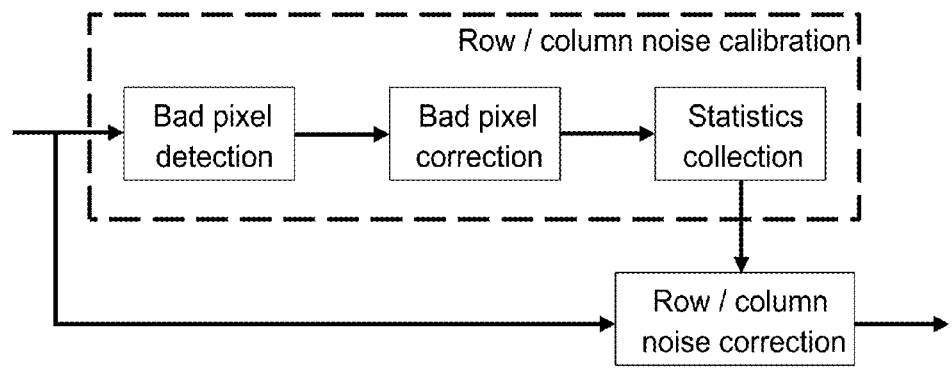
FIG. 11B illustrates a process flow in which defective pixels are corrected.
Figure 11C:
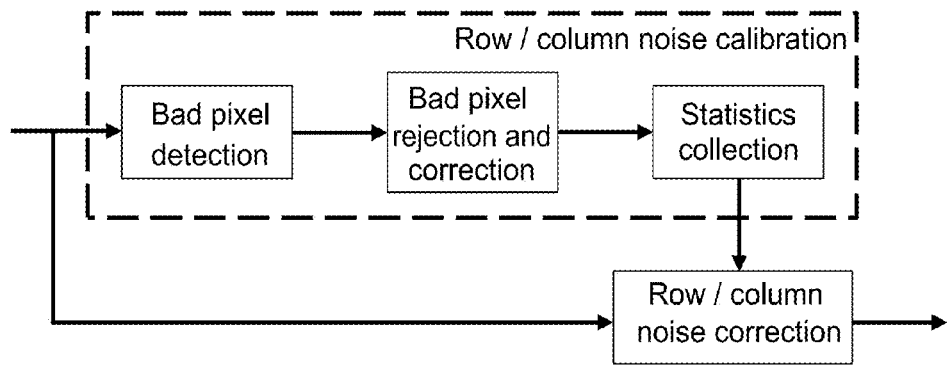
FIG. 11C illustrates a process flow in which defective pixels may be either rejected or corrected.

FIG. 11 illustrates conceptually an overview of the row/column noise calibration and correction processes with defective pixel rejection/correction. In FIG. 11A, the pixel values from calibration pixels 105B are first considered to detect defective pixels, then pixel values of defective pixels 105B are rejected from the pixel data, then the pixel data without the defective pixels is used to generate the calibration statistics (e.g., the mean of the pixel values); and finally, the calibration statistics are used to correct the pixel values of the bright pixels 105A. In FIG. 11B, the pixel values from calibration pixels 105B are first considered to detect defective pixels, then pixel values of defective pixels 105B are corrected in the pixel data, then the pixel data including the corrected defective pixels is used to generate the calibration statistics (e.g., the mean of the pixel values); and finally, the calibration statistics are used to correct the pixel values of the bright pixels 105A. In FIG. 11C, the pixel values from calibration pixels 105B are first considered to detect defective pixels, then pixel values of defective pixels 105B are rejected from the pixel data or corrected in the pixel data, then the pixel data is used to generate the calibration statistics (e.g., the mean of the pixel values); and finally, the calibration statistics are used to correct the pixel values of the bright pixels 105A.

According to first exemplary embodiment, a pixel 105B in a given optical dark row (for row noise processing) or in a given optical dark column (for column noise processing)

is considered to be a defective pixel if its pixel value is one of the highest or lowest pixel values for the given row/column. Specifically, two numbers are set in advance of performing the calibration process: MH and ML. After the pixel values of a given optical dark row/column are read out, the MH highest pixel values and the ML lowest pixel values of the given row/column are determined to be defective.

Figure 8:
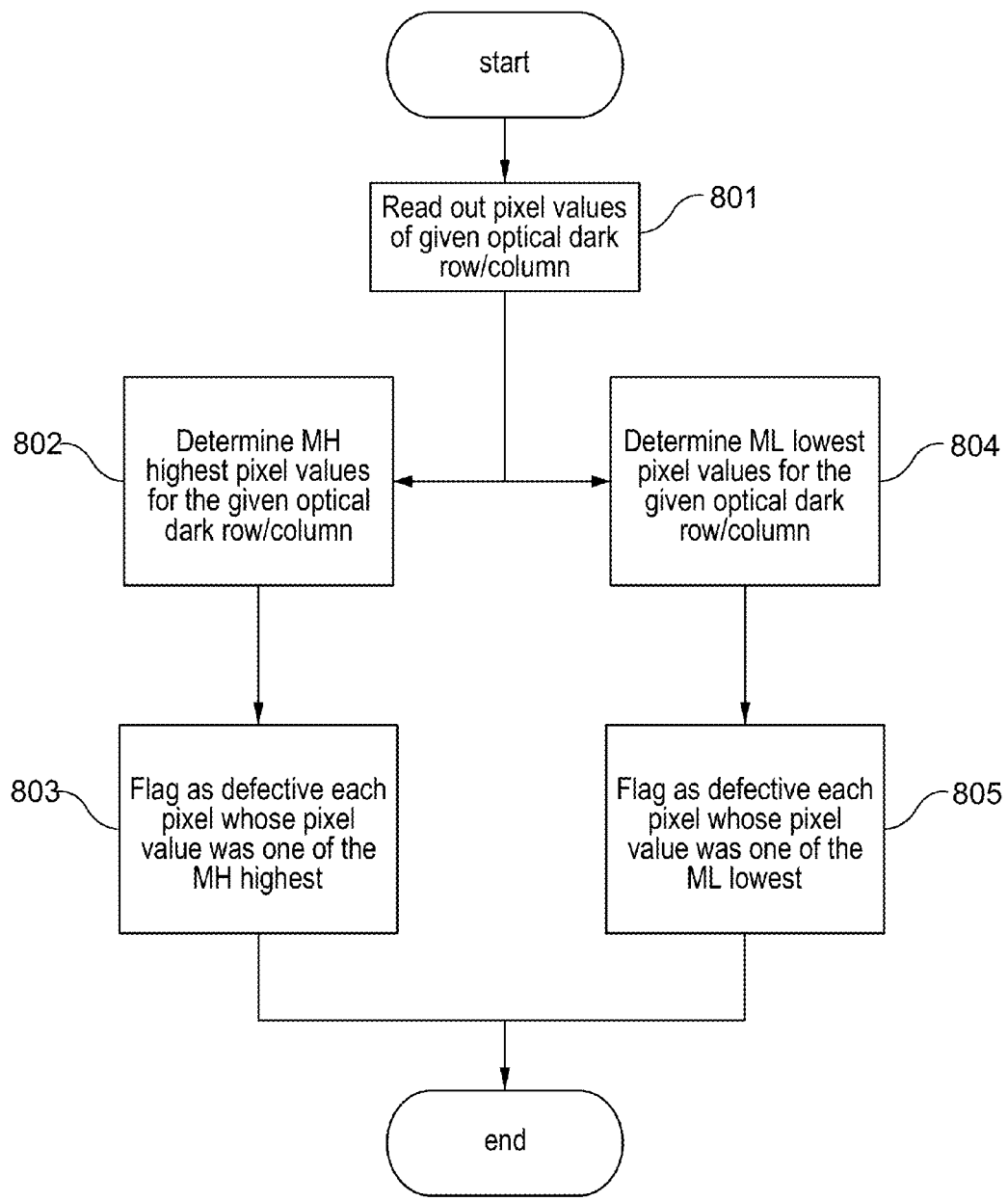
FIG. 8 is a flow chart illustrating a first exemplary defective pixel detection process.

This process is illustrated in FIG. 8. In step 801, the pixel values of a given optical dark row or of a given optical dark column are read out. In step 802, the MH highest pixel values for the given optical dark row/column are determined. In step 803, those pixels 105B whose pixel value was one of the MH highest pixel values for the given row/column are flagged as defective. In step 804, the ML lowest pixel values for the given optical dark row/column are determined. In step 805, those pixels 105B whose pixel value was one of the ML lowest pixel values for the given row/column are flagged as defective.

MH and ML may be set to the same value, or to different values. This method is premised on the fact that the defective pixel values will usually be among the highest or the lowest pixel values. If there are more than MH high-value defective pixels 105B or more than ML low-value defective pixels 105B, then some defective pixels 105B might not be detected as defective. On the other hand, if there are less than MH high-value defective pixels 105B or less than ML low-value defective pixels 105B, then some good pixels 105B may be erroneously flagged as defective. Thus, values for MH and ML are preferably selected so as to ensure that all defective pixels 105B are detected while minimizing a number of good pixels 105B that are erroneously detected as defective. For example, the two quantities MH and ML may be selected based on the image sensor 100 noise parameters. For more noisy image sensors 100 that have more bad pixels 105B, higher values of MH and ML could beneficially be selected, to ensure that all bad pixels 105B are detected. For less noisy image sensors 100, lower values of MH and ML could beneficially be selected, to ensure that a minimum number of good pixels 105B are flagged as defective. An advantage of this method is that there is no need to know in advance the average value for the optical black pixels 105B, which may change as a function of the temperature or exposure time.

According to a second exemplary embodiment, a pixel 105B in a given optical dark row (for row noise processing) or in a given optical dark column (for column noise processing) is considered to be a defective pixel if its pixel value is outside of a predetermined range. Specifically, upper and lower limits of the range, ThreshH and ThreshL, may be established, and after the pixel values of a given optical dark row/column are read out, any pixels 105B whose pixel values are outside the range are determined to be defective.

Figure 9:
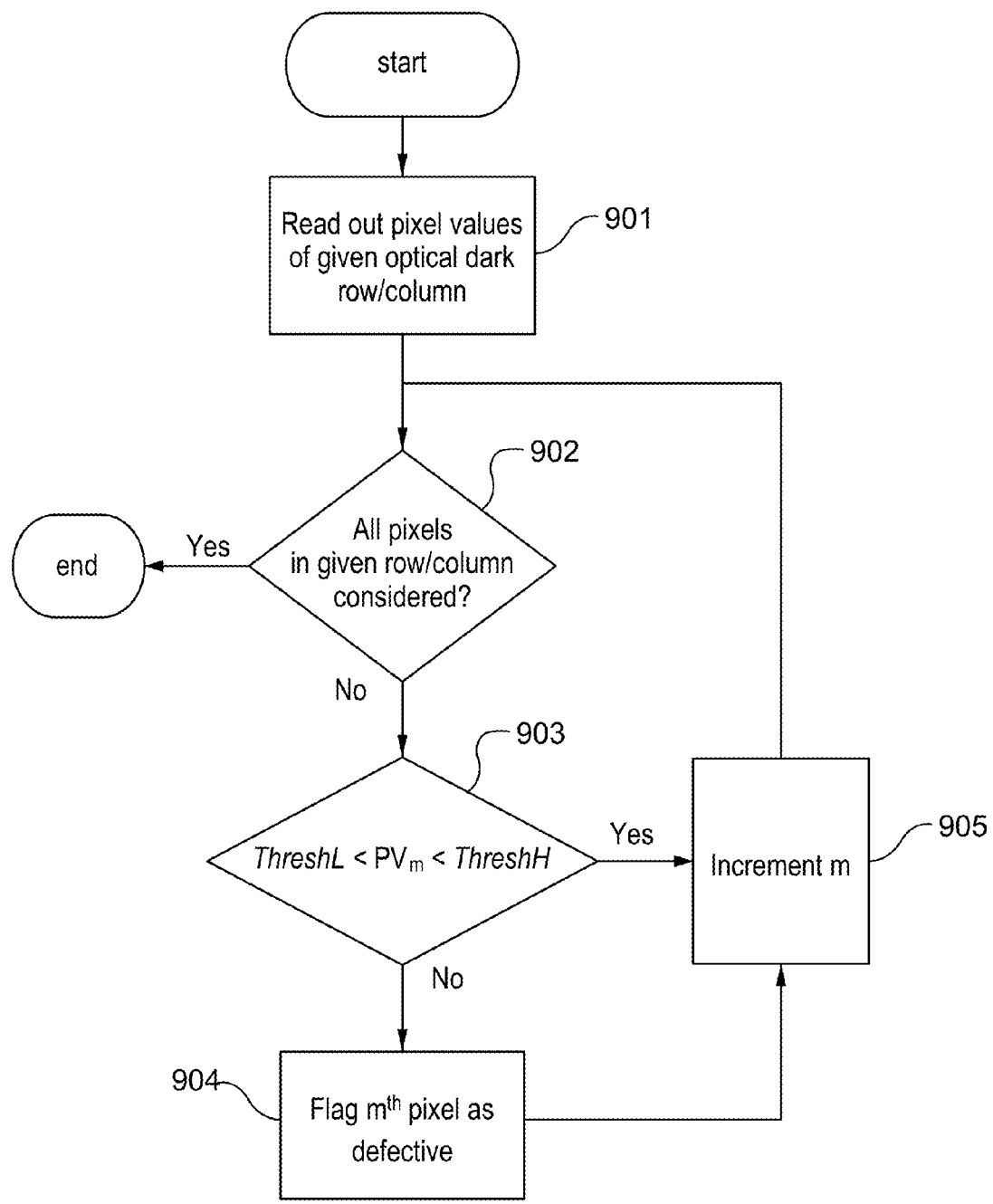
FIG. 9 is a flow chart illustrating a second exemplary defective pixel detection process.

This process is illustrated in FIG. 9. In step 901, the pixel values of a given optical dark row or of a given optical dark column are read out. Then, each of the pixels 105B in the given row/column are considered in a loop comprising steps 902 through 905. In step 902, it is determined whether all of the pixels 105B have been considered. If all pixels 105B in the given row/column have been considered, then the process ends, if not, then the process proceeds to step 903. In step 903, it is determined whether the pixel value for the $m^{th}$ pixel 105B in the given row/column, designated by $PV_m$ in FIG. 9, is within the range defined by the upper and lower thresholds ThreshH and ThreshL. Although the figure shows exclusive limits (greater than/less than), inclusive limits (greater than or equal/less than or equal) may also be used. If $PV_m$ is within the range, then the process proceeds to step 905, m is incremented, and the next pixel 105B is considered (i.e., the $m^{th}$ pixel 105B is not defective). If $PV_m$ is not within the range, then the process proceeds to step 904, in which the $m^{th}$ pixel 105B is flagged as defective, whereupon the process proceeds to step 905 and the loop begins again.

The thresholds ThreshH and ThreshL should be set such that the range is wide enough to accommodate the normal variation of non-defective pixels, but not so wide that too many defective pixels 105B go undetected. An advantage of this method is that it is very simple to implement and may be less likely to falsely declare a good pixel 105B as defective as compared to other methods.

According to a third exemplary embodiment, a pixel 105B in a given optical dark row (for row noise processing) or in a given optical dark column (for column noise processing) is considered to be a defective pixel 105B based on consideration of neighboring pixels 105B. Specifically, neighbors of a given pixel 105B may be considered and the given pixel 105B may be declared as defective based on its neighbors even if it would not have been declared defective otherwise.

Figure 10:
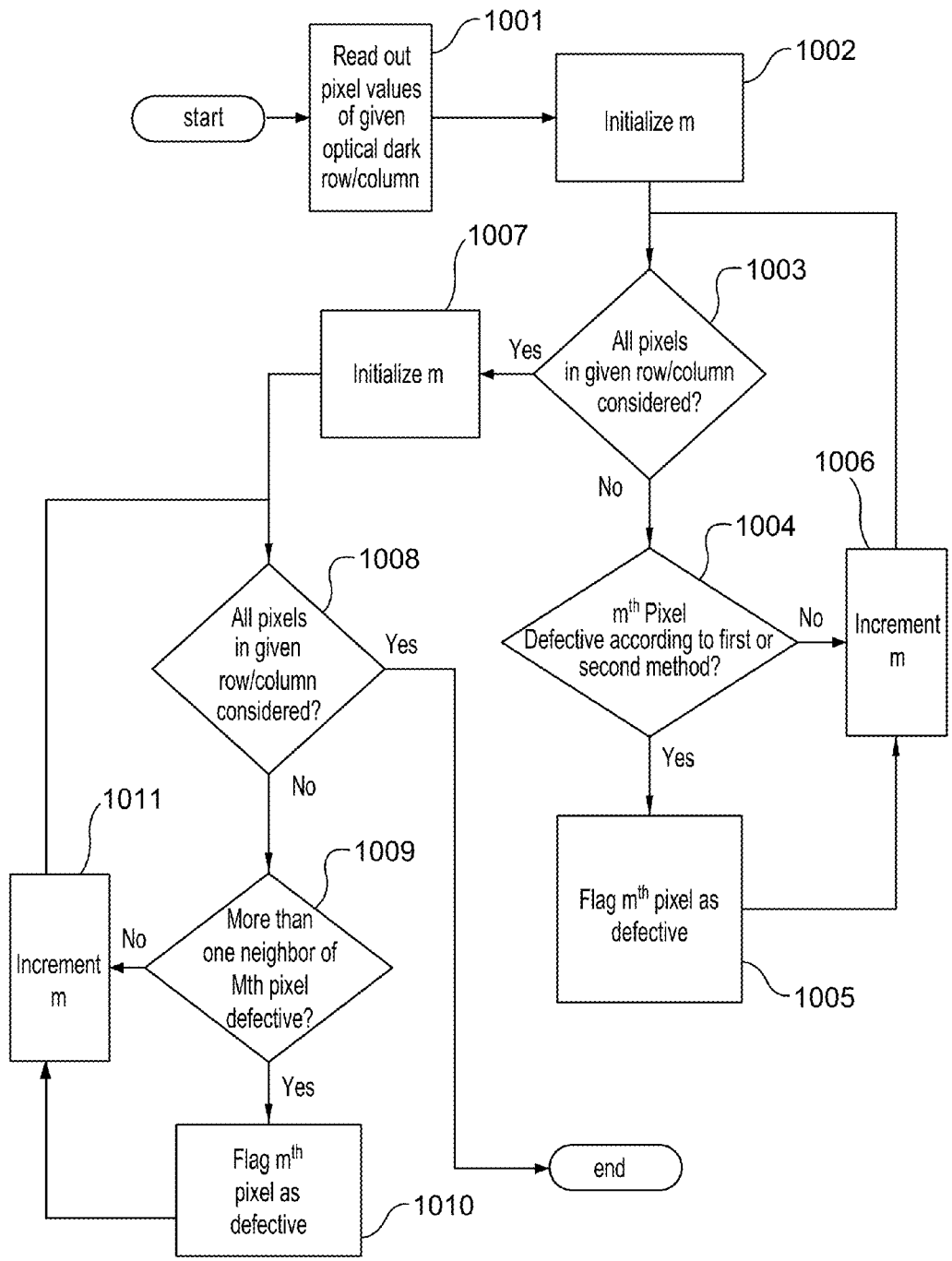
FIG. 10 is a flow chart illustrating a third exemplary defective pixel detection process.

This process is illustrated in FIG. 10. In step 1001 the pixel values of a given optical dark row or of a given optical dark column are read out. In step 1002 m is initialized (for example, to 1). Then, each of the pixels 105B in the given row/column are considered in a loop comprising steps 1003 through 1006. In step 1003, it is determined whether all of the pixels 105B have been considered. If all pixels 105B in the given row/column have been considered, then the process proceeds to step 1007; if not, then the process proceeds to step 1004. In step 1004, it is determined whether the $m^{th}$ pixel 105B in the given row/column is defective according to one of the methods of the first or second embodiments. If the result of step 1004 is yes, then the process proceeds to step 1005 and the $m^{th}$ pixel 105B is flagged as defective, and then the process proceeds to step 1006. If the result of step 1004 is no, then the process proceeds to step 1006. In step 1006 m is incremented, and the next pixel 105B is considered in the loop. Once all of the pixels have been considered in the first loop comprising steps 1003-1006, the process proceeds to step 1007 in which m is initialized again, and then a second loop comprising steps 1008-1011 is executed to consider the neighbors of each pixel 105B. In step 1008, it is determined whether all of the pixels 105B of the given row/column have been considered in the second loop. If so, the process ends; if not, then the process proceeds to step 1009. In step 1009, the neighbors of the $m^{th}$ pixel 105B are considered, and if more than one of the neighbors of the $m^{th}$ pixel 105B were flagged as defective, then the process proceeds to step 1010 in which the $m^{th}$ pixel 105B is also flagged as defective. In step 1009, the neighbors of the $m^{th}$ pixel 105B may include neighbors within a sliding window around the $m^{th}$ pixel 105B. For example, a window 5 pixels wide may be used, in which case the neighbors considered in step 105B would include the $(m-2)^{th}$ pixel 105B, the $(m-1)^{th}$ pixel 105B, the $(m+1)^{th}$ pixel 105B, and the $(m+2)^{th}$ pixel 105B. If less than two of the neighbors of the $m^{th}$ pixel 105B are defective, then the process proceeds to step 1011 without flagging the $m^{th}$ pixel 105B.

Although not illustrated, pixels 105B already flagged as defective may be excluded from being considered as the subject pixel in the second loop comprising steps 1008-1011. Moreover, the number of neighbors that need to be defective in order to determine that the $m^{th}$ pixel 105B is defective, may be arbitrarily set, and the example of step 1009 is merely exemplary. The rationale behind the third embodiment is that even if a given pixel 105B is not detected as defective by one of the other methods, if too many of its neighbors are detected as defective, then it is likely that the given pixel is located in a noisy region of the image sensor 100, and hence its value should not be relied on even though the given pixel 105B passes the other methods of detection.

Once pixels 105B have been determined to be defective by any method, the pixels 105B can be dealt with in various ways. One approach is to exclude the output pixel value of the defective pixel 105B from the calculation of the mean for the row/column in the calibration process (also referred to herein as "rejecting" the defective pixel 105B). Another approach is to assign a derived value to the defective pixel 105B in lieu of its actual pixel value, and use the derived pixel value ("corrected" pixel value) in the calculation of the mean for the row/column in the calibration process (also referred to herein as "correcting" the defective pixel 105B). These approaches can also be combined, wherein some defective pixels 105B may be rejected while other pixels 105B may be corrected.

Figure 12:
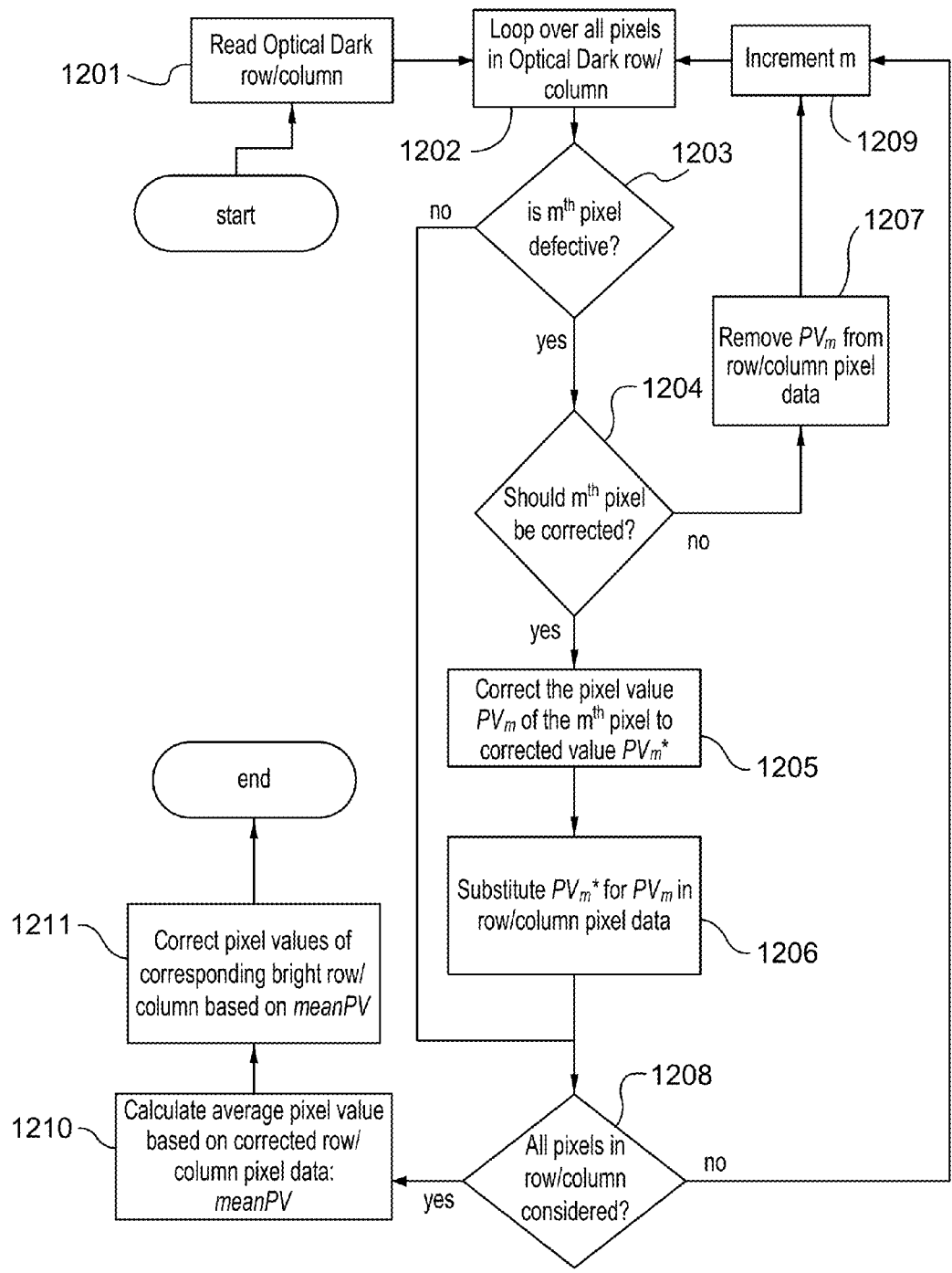
FIG. 12 is a flow chart illustrating a first exemplary defective pixel detection process of rejecting and/or correcting defective pixels in row/column noise calibration and correction.

FIG. 12 illustrates an exemplary process for accounting for defective pixels in association with the row/column calibration process described above. In step 1201, a given optical dark row or column is read. In step 1203 a loop is begin over all pixels in the given row/column. In step 1203, it is determined whether the $m^{th}$ pixel 105B is defective. For example, the processes of FIGS. 7-10 could be separately applied prior to step 1203 to determine all of the defective pixels 105B in the given row/column, in which case step 1203 could include checking for which pixels 105B were flagged as defective. Alternatively, processes such as those illustrated in FIGS. 7-10 could be run concurrently with the process of FIG. 12. In step 1204 it is determined whether the pixel value of the $m^{th}$ pixel 105B should be corrected. If the pixel value should not (or cannot) be corrected, then the process proceeds to step 1207 in which the pixel 105B is rejected—i.e., the pixel value of the $m^{th}$ pixel 105B (designated $PV_m$ in FIG. 12) is removed from the pixel data of the given row/column (at least for purposes of calculating the average pixel value). If the pixel value of the $m^{th}$ pixel 105B can be corrected, then the process proceeds to step 1205, in which the corrected pixel value $PV_m^*$ is substituted in lieu of the actual pixel value $PV_m$ in the pixel data of the given row/column. In step 1208, it is determined whether all of the pixels in the row/column have been considered; if not the loop is continued (step 1209), and if so the loop is ended (step 1210). In step 1210 the average pixel value meanPV for the given row/column is calculated based on the pixel data for the given row/column as corrected. In particular, the pixel data for the given row/column that is used in step 1210 is the pixel data that was amended to substitute any corrected values by way of block 1206 and to exclude any values rejected by way of block 1207. In step 1211, the bright pixels 105A in the bright row/column corresponding to the given optical dark row/column are corrected based on meanPV for the given row/column.

The process of FIG. 12 may be combined with the other processes described above, such as the processes for detecting defective pixels and the row/column calibration processes, in which case corresponding steps in the processes could be combined into a single step. For example, the reading discussed in step 1201 of FIG. 12 may correspond to (or be included as a part of) any of the previously described reading steps, such as steps 601, 701, 801, 901, or 1001. As another example, the steps 1210 and 1211 of FIG. 12 may correspond to (or be included as part or) steps 602/603 or 702/703.

Moreover, although the process of FIG. 12 is described as being performed for a single row/column at a time, it will be understood that this is merely for ease of description and other arrangements could be used. For example, all of the pixels 105B (as well as the pixels 105A) could be read out in step 1201 and their pixel values stored, and the loop of step 1202 could be done over all of the pixels 105B; then, the steps 1210 and 1211 could be repeated for each row/column being corrected (with a different value of meanPV for each row/column, of course). In addition, the exemplary process of FIG. 12 combines both rejection and correction of defective pixels 105B merely as an example, but it will be understood that similar processes could be used in which defective pixels 105B are always rejected or in which defective pixels 105B are always corrected.

When defective pixels 105B are corrected, a derived pixel value may be substituted for the defective pixel's actual pixel value. The derived value may be determined based on the defective pixel's neighbors. Generally, the pixel value of the defective pixel 105B is not used in the generation of the derived value.

For example, the derived value may be the average of the pixel values of the defective pixel 105B's neighbors. For example, if K neighbors are used for this method of correction in a row-noise correction process, then the pixel value of the $(i,j)^{th}$ defective pixel 105B would be replaced by:

$$\text{average}\{SC(i,j-K/2), \ldots, SC(i,j-1), SC(i,j+1), \ldots, SC(i,j-K/2)\} \quad \text{(eq. 9)}$$

where SC is short for the SignalCalib discussed above.

As another example, the derived value may be the median of the pixel values of the defective pixel 105B's neighbors. For example, if K neighbors are used for this method of correction in a row-noise correction process, then the pixel value of the $(i,j)^{th}$ defective pixel 105B would be replaced by:

$$\text{median}\{SC(i,j-K/2), \ldots, SC(i,j-1), SC(i,j+1), \ldots, SC(i,j-K/2)\} \quad \text{(eq. 9)}$$

Other methods of bad pixel correction may be used. For example, any known interpolation method may be used to interpolate a corrected value for the defective pixel 105B based on its neighbors. Moreover, there need not be only one possible corrected value for a defective pixel 105B—for example, several threshold values can be specified (either fixed threshold, or calculated threshold based on the statistics of the neighborhood) so as to define a number of ranges, and the corrected value that is specified for the defective pixel 105B can depend on the range in which the pixel value of the defective pixel 105B falls.

The row and/or column calibration and correction processes described herein may be performed in advance of imaging (for example, to remove fixed pattern noise), and the calibration values obtained from such a calibration operation may be stored for later use. In addition, the row and/or column calibration and correction processes described herein may be performed concurrently with imaging (for example, to remove temporal noise). For example, the row and/or column calibration and correction processes described herein may be used each time that an image is taken, with the calibration values being determined anew each image frame.

FIGS. 14 through 17 illustrate several examples of calibration and correction results based on the methodologies presented above. Test examples were performed using the distribution with bad pixels represented by the second data set 1302 from FIG. 13.

Figure 14:
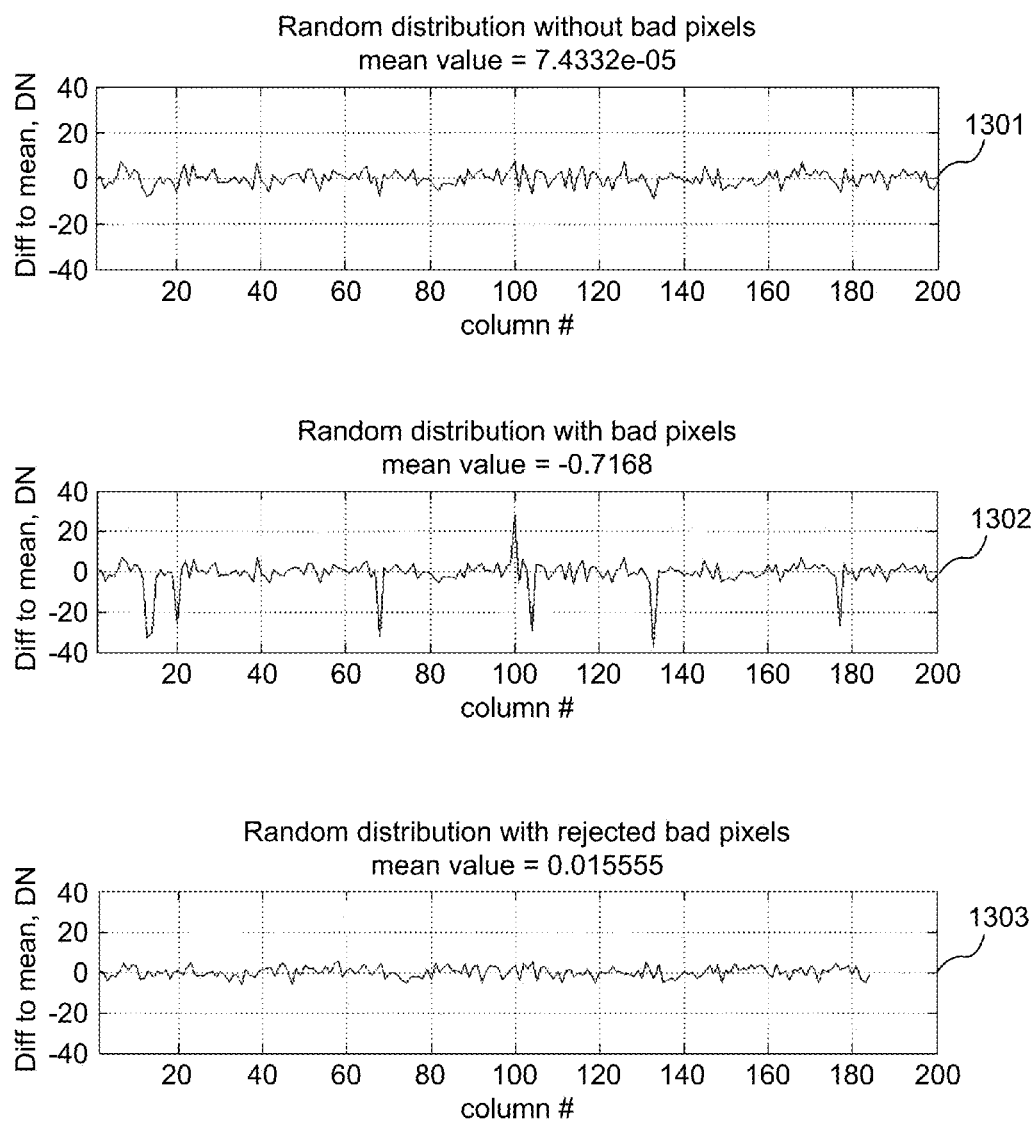
FIG. 14 includes graphs showing the first distribution 1301 of pixel values without defective pixels and the second distribution 1302 with defective pixels, and a third distribution 1303 with defective pixels rejected.

FIG. 14 illustrates the result of detecting defective pixels 105B according to the process of FIG. 8 with MH=ML=8. In this case the 16 declared bad pixels are rejected from the random distribution, resulting in the modified distribution 1303. The upper graph illustrates the distribution 1301, which is a random distribution of the optically black pixel values without bad pixels 105B, the middle graph illustrates the distribution 1302, which represents the same distribution but with bad pixels 105B, and the bottom graph illustrates the distribution 1303, which represents the distribution 1302 after rejecting bad pixels 105B. The resulting mean value after the rejection of the bad pixels 105B in this case equals 0.016, which is much smaller in magnitude than the value −0.72 when bad pixels 105B are not removed.

Figure 15:
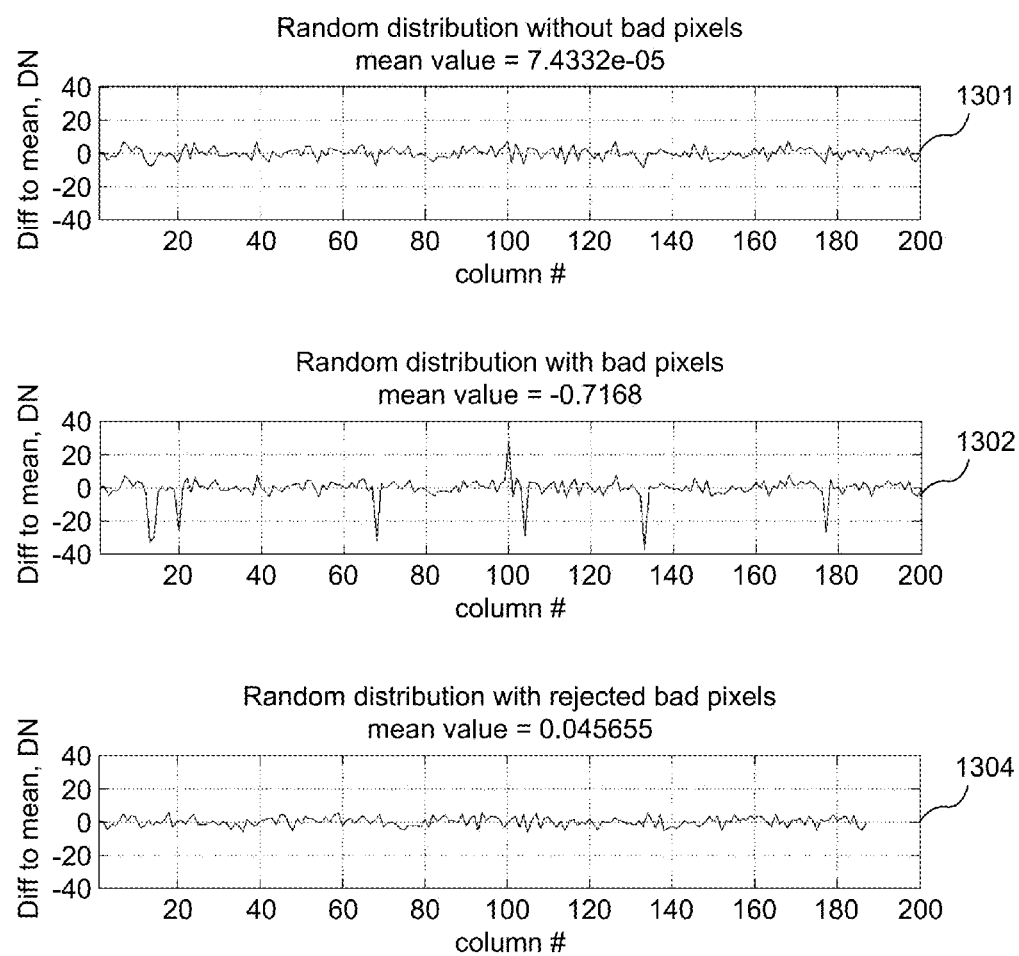
FIG. 15 includes graphs showing the first distribution 1301 of pixel values without defective pixels and the second distribution 1302 with defective pixels, and a third distribution 1304 with defective pixels rejected.

FIG. 15 illustrates the result of rejecting as defective pixels 105B according to the process of FIG. 9 with ThreshL=−10 and ThreshH=10. In FIG. 10, the upper graph illustrates the distribution 1301, which is a random distribution of the optically black pixel values without bad pixels 105B, the middle graph illustrates the distribution 1302, which represents the distribution 1301 but with bad pixels 105B, and the bottom graph illustrates the distribution 1304, which represents the distribution 1302 after rejecting bad pixels 105B. The resulting mean value after the rejection of the bad pixels 105B in this case equals 0.04, which is much smaller in magnitude than the value −0.72 when bad pixels 105B are not removed.

Figure 16:
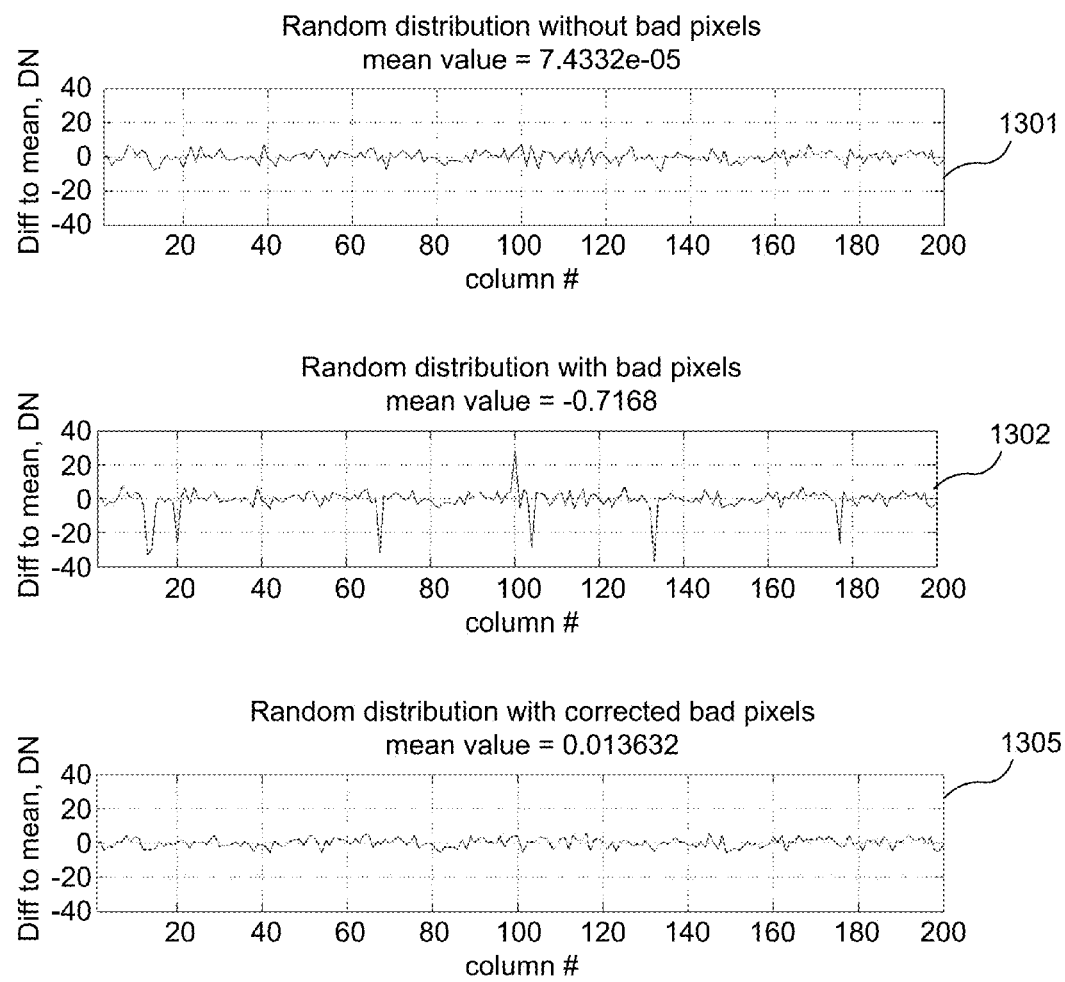
FIG. 16 includes graphs showing the first distribution 1301 of pixel values without defective pixels and the second distribution 1302 with defective pixels, and a third distribution 1305 with defective pixels corrected.

FIG. 16 illustrates the result of correcting bad pixels, using a median of neighboring pixels to derive the corrected pixel value. In FIG. 16, bad pixels are detected according to the method of FIG. 10, and the number of neighbors used in the correcting process is K. In FIG. 16 the upper graph illustrates the distribution 1301, which is a random distribution of the optically black pixel values without bad pixels 105B, the middle graph illustrates the distribution 1302, which represents the distribution 1301 but with bad pixels 105B, and the bottom graph illustrates the distribution 1305, which represents the distribution 1302 after correcting the bad pixels 105B. The resulting mean value after the correction of the bad pixels 105B in this case equals 0.014, which is much smaller in magnitude than the value −0.72 when bad pixels 105B are not corrected.

Figure 17:
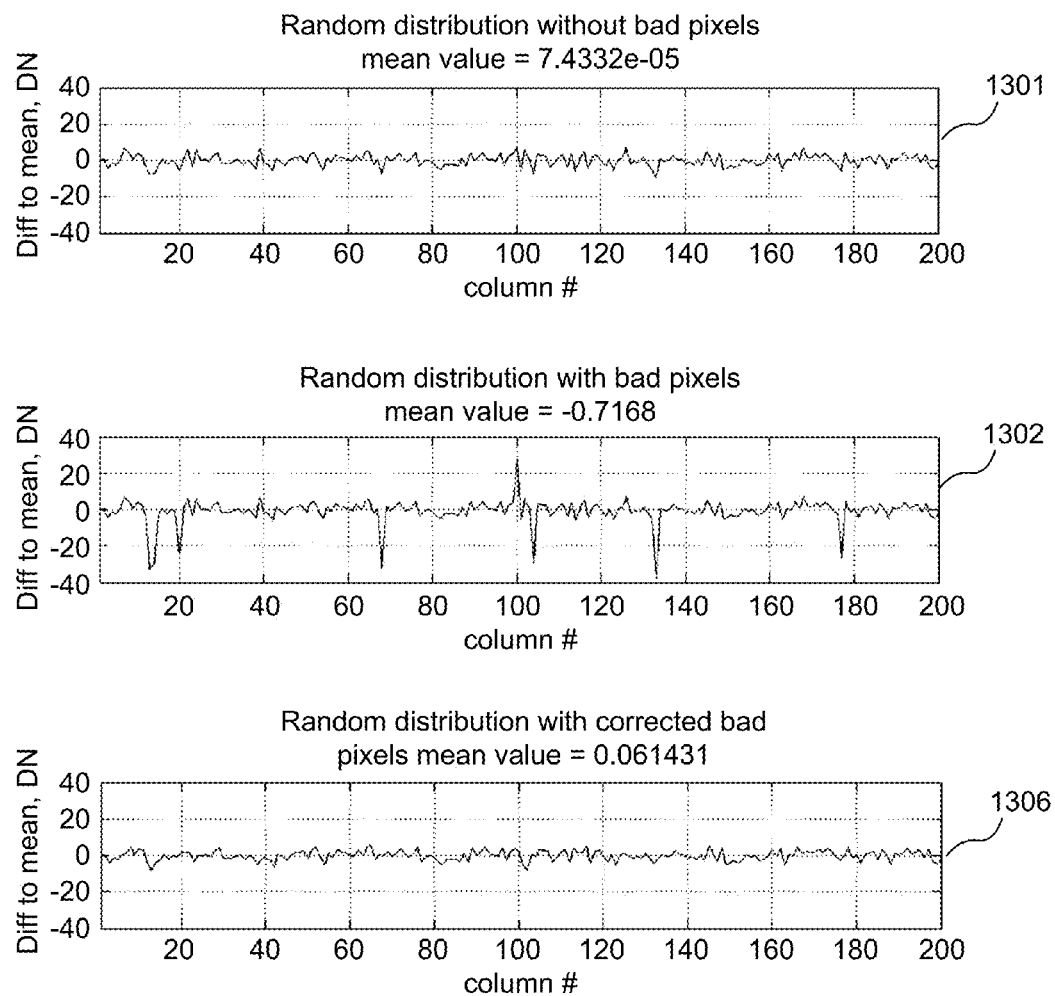
FIG. 17 includes graphs showing the first distribution 1301 of pixel values without defective pixels and the second distribution 1302 with defective pixels, and a third distribution 1306 with defective pixels corrected.

FIG. 17 illustrates the result of correcting bad pixels, using an average of neighboring pixels to derive the corrected pixel value. In FIG. 16, bad pixels are detected according to the method of FIG. 10, and the number of neighbors used in the correcting process is K. In FIG. 17 the upper graph illustrates the distribution 1301, which is a random distribution of the optically black pixel values without bad pixels 105B, the middle graph illustrates the distribution 1301, which represents the distribution 1301 but with bad pixels 105B, and the bottom graph illustrates the distribution 1306, which represents the distribution 1302 after correcting the bad pixels 105B. The resulting mean value after the correction of the bad pixels 105B in this case equals 0.06, which is much smaller in magnitude than the value −0.72 when bad pixels 105B are not corrected.

The following table summarizes the result of the various exemplary cases discussed above:

| Test Case | | Magnitude of |
|---|---|---|
| Bad Pixel Detection Process | Rejection/ Correction Process | Residual Error |
| None | None | 0.72 |
| Process of FIG. 8 | Rejected | 0.016 |
| Process of FIG. 9 | Rejected | 0.04 |
| Process of FIG. 10 | Corrected by neighbors' median value | 0.01 |
| Process of FIG. 10 | Corrected by neighbors' mean value | 0.06 |

The results show that any of the methods discussed above for defective pixel 105B detection and rejection/correction give significantly better results compared to the reference case without bad pixel treatment. Decisions on which specific method to use in an actual implementation depend on the image sensor architecture, noise parameters and other design considerations.

FIGS. 18-21 show the results of implementing examples of the present disclosure's row/column calibration and correction techniques with defective pixel 105B detection and rejection/correction.

FIG. 18 is an example of a reference image with row noise and pixel noise. As can be seen in FIG. 18, the row noise manifests as "stripes" in the image.

Figure 19:
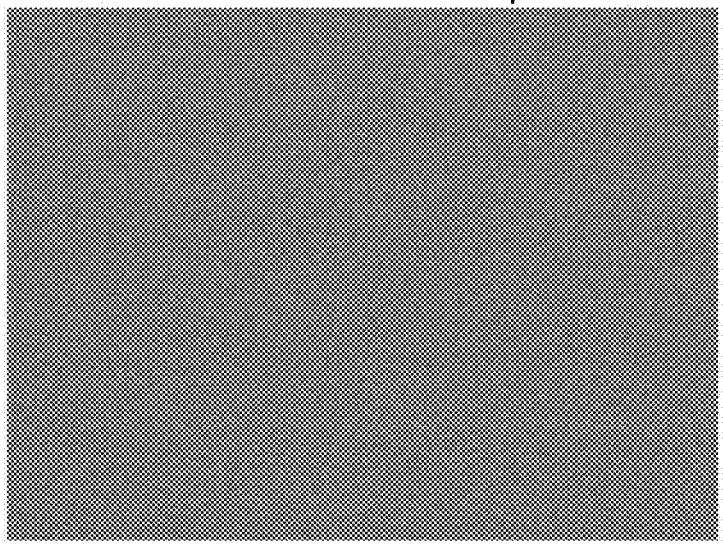
FIG. 19 illustrates an image with row noise that has been corrected using optical black columns that have no defective pixels.

FIG. 19 is an example of the reference image in which the row noise has been corrected according to the row noise calibration and correction process described above, and where there are no defective pixels 105B in the optical black area 110B that was used for the row correction.

Figure 20:
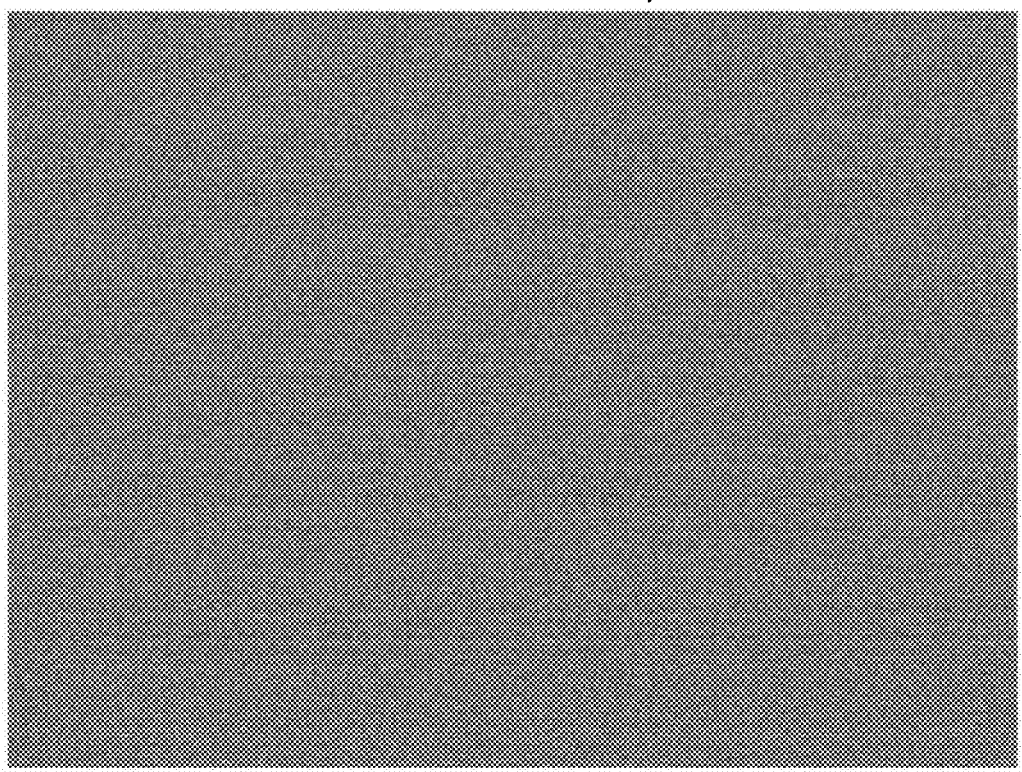
FIG. 20 illustrates an image with row noise that has been corrected using optical black columns that have defective pixels, but in which defective pixel detection was not performed.

FIG. 20 is an example of the reference image in which the row noise has been corrected according to the row noise calibration and correction process describe above and in which there were defective pixels 105B in the optical black area 110B that was used for the row correction, and in which the defective pixel 105B detection and rejection/correction procedures were not used. As can be seen in FIG. 20, residual row noise can be observed despite the row correction, due to the presence of the bad pixels 105B in the calibration area. Since the residual row noise is a consequence of the bad pixels 105B in the calibration area, the residual row noise may have a different structure from the row noise in the original image.

Figure 21:
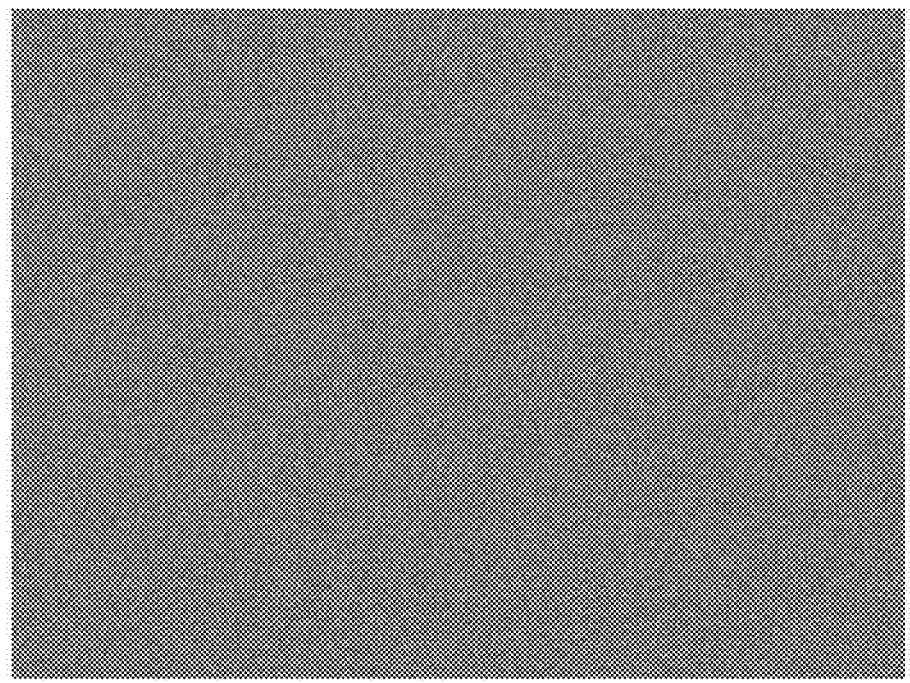
FIG. 21 illustrates an image with row noise that has been corrected using optical black columns that have defective pixels an in which defective pixel detection was performed.

FIG. 21 is an example of the reference image with row noise, in which the row noise has been corrected according to the row noise calibration and correction process describe above and in which there were defective pixels 105B in the optical black area 110B that was used for the row correction, and in which the defective pixel 105B detection and rejection/correction procedures was used. Bad pixel 105B correction using median filtering was incorporated in the row noise calibration procedure. As can be seen by comparing the image in FIG. 21 with the image in FIG. 20, the row noise corrected results when the defective pixel 105B detection and rejection/correction processes are applied are much better than when row correction alone is applied (without defective pixel 105B detection and rejection/correction). As can be seen by comparing the image in FIG. 21 with the image in FIG. 19, the row noise corrected results when the defective pixel 105B detection and rejection/correction processes are applied to an image sensor 100 with defective pixels 105B are similar to the results of row noise correction in an image sensor 100 without any defective pixels 105B.

Figure 22:
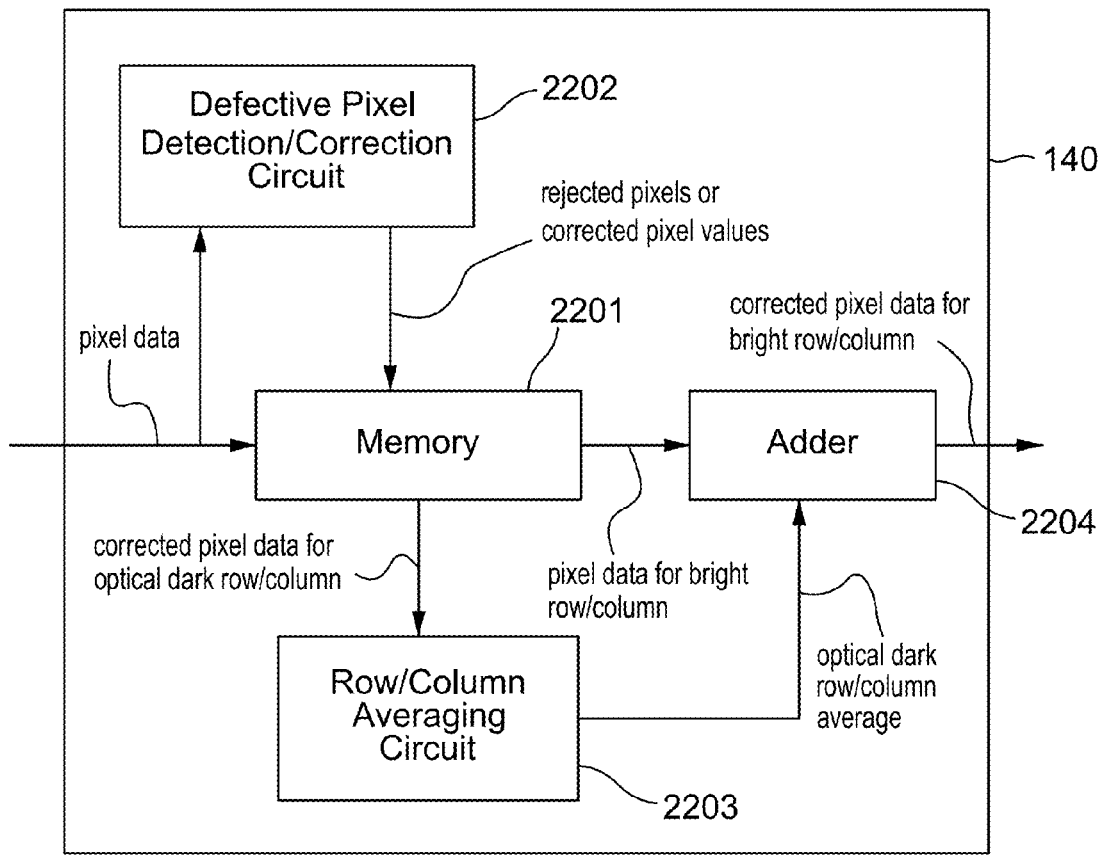
FIG. 22 is a conceptual diagram illustrating a first example of a Calibration and Correction Circuit 140.

The row/column calibration and correction and defective pixel detection processes described above may be implemented in various ways. For example, FIG. 22 illustrates an exemplary Calibration and Correction Circuit 140, which includes a Memory 2201, a Defective Pixel Detection/Correction Circuit 2202, a Row/Column Averaging Circuit 2203, and an Adder 2204. In the example of FIG. 22, pixel data is received by the Calibration and Correction Circuit 140 and stored in the memory 2201. The pixel data may be data for bright row and its corresponding optical dark row, data for a bright column and its corresponding optical dark column, or data for all of the bright pixels 105A and the dark pixels 105B. The pixel data is also input into the Defective Pixel Detection/Correction Circuit 2202. The Defective Pixel Detection/Correction Circuit 2202 detects defective dark pixels 105B based on the pixel data, and cause the memory 2201 to either remove the pixel value of a defective pixel 105B from the pixel data or to substitute a corrected pixel value for the pixel value of a defective pixel 105B. The corrected pixel data of a given optical dark row or column (i.e., the pixel data after having been updated by the Defective Pixel Detection/Correction Circuit 2202 to exclude or correct defective pixels 105B), is input from the memory 2201 to the Row/Column Averaging Circuit 2203, which computes an average of the pixels values in the corrected pixel data. Pixel data for a bright row/column corresponding to the dark row/column is input to the Adder 2204, along with the average computed by the Row/Column Averaging Circuit 2203, and the Adder 2204 subtracts the average from each of the pixel values of the bright row/column. The Adder 2204 outputs the resulting values as corrected pixel data for the bright row/column.

The Memory 2201 may be any form of memory, whether volatile or non-volatile, DRAM, SRAM, flash memory, etc. The Memory 2201 may be dedicated specifically to the Calibration and Correction Circuit 140, or it may be a general purpose memory that is used for other purposes as well.

The Adder 2204 may be configured by known circuit elements (e.g., a digital adder), by a processor executing programing causing it to perform addition, or by a combination of the two.

The Defective Pixel Detection/Correction Circuit 2202 may be configured by logic circuits specifically configured to execute the pixel detection/correction, by a processor executing programing causing it to perform the pixel detection/correction, or by a combination of the two.

The Row/Column Averaging Circuit 2203 may be configured by logic circuits specifically configured to calculate an average of the pixel data, by a processor executing programing causing it to calculate an average of the pixel data, or by a combination of the two.

The Adder 2204, the Defective Pixel Detection/Correction Circuit 2202, and the Row/Column Averaging Circuit 2203 may all share the same processor, or may have their own special-purpose processors. One or more of the processors may also be used by other components of the image sensor 100.

Figure 23:
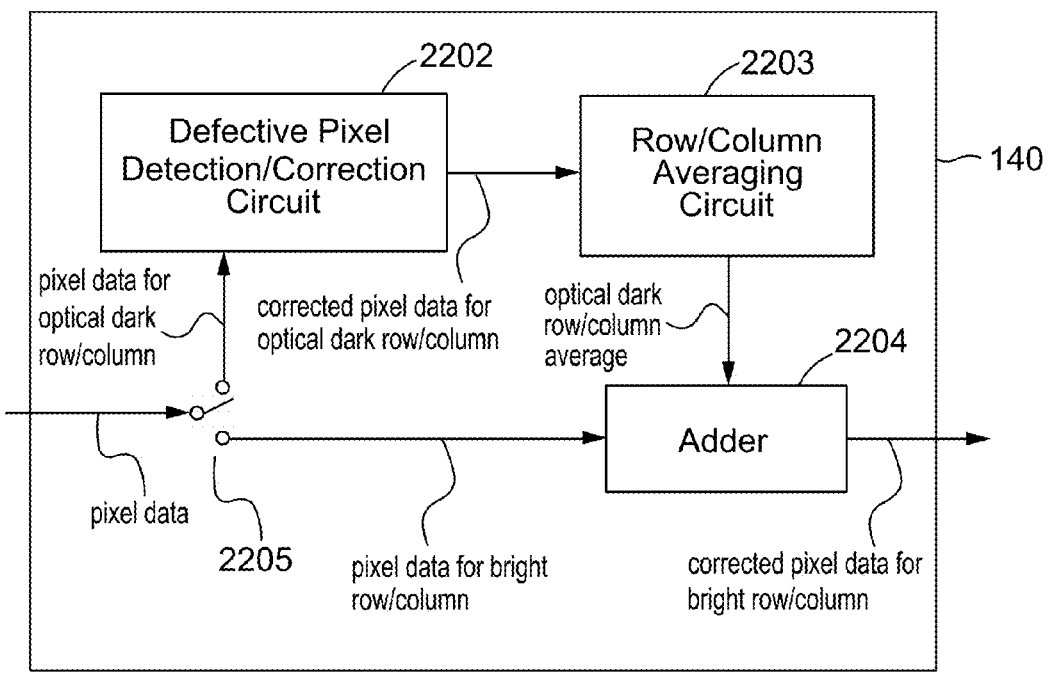
FIG. 23 is a conceptual diagram illustrating a second example of a Calibration and Correction Circuit 140.

FIG. 23 shows a second embodiment of the Calibration and Correction Circuit 140. The circuit blocks are similar to those of FIG. 22, except that the arrangement of the data paths is different, the memory element 2201 is not present, and a switch 2205 is added. Similar circuit elements are given the same reference numbers in FIGS. 22 and 23. For this embodiment, the pixel data is arranged so that the Calibration and Correction Circuit 140 receives the data for a dark row before the bright data for the same row, or receives the data for a dark column before the bright data for the same column. A switch 2205 is configured so that the pixel data for dark row/column is sent to the Defective Pixel Detection/Correction Circuit 2202. The Defective Pixel Detection/Correction Circuit 2202 detects defective dark pixels 105B based on the pixel data. If a dark pixel is detected to be defective, the Defective Pixel Detection/Correction Circuit 2202 either rejects the defective pixel by not sending the pixel value to the Row/Column Averaging Circuit 2203, or substitutes a corrected pixel value for the defective pixel and sends the substituted value to the Row/Column Averaging Circuit 2203. If a dark pixel is detected to be a good pixel, the pixel value is sent to the Row/Column Averaging Circuit 2203. The Row/Column Averaging Circuit 2203 accumulates the dark pixel values as each new value is received, and calculates the average optical dark row/column value when all the dark values for the row/column are received. The average value is sent to the Adder 2204. At this time the position of the switch 2205 is flipped so that the bright pixel data for the bright row/column corresponding to the dark data are sent to the Adder 2204, which corrects the bright data and sends the corrected bright pixel data to the output. Similar as in FIG. 22, the blocks in FIG. 23 can be implemented using dedicated logic circuits, or using a program that executes on a computing device.

The Calibration and Correction Circuit 140 in FIGS. 22 and 23 may be included on the same semiconductor substrate (same chip) as the pixel array 110. Alternatively, the Calibration and Correction Circuit 140 may be provided separately from the pixel array 110. In addition, the Calibration and Correction Circuit 140 may be provided by mounting the appropriate program code in a computing device that has access to the pixel data from the image sensor 110—in such a case, the execution of the program code transforms the processor and the memory of the computing device into the Calibration and Correction Circuit 140. For example, when an image sensor is included in an electronic device such as a smart phone, the Calibration and Correction Circuit 140 may be included in the electronic device by loading software into the electronic device.

Although the image sensor 100 was described above in assembled form, it will be understood that various components of the image sensor 100 might be manufactured/distributed separately (perhaps by different manufacturers) and then later combined (perhaps by a third manufacturer). For example, a pixel array unit 110 portion may be manufactured as a module separately from a module comprising the Calibration Circuit 140.

Furthermore, the image sensor 110 may be included in numerous types of electronic devices, along with an optical system for focusing light on the image sensor. The optical system may comprise an objective lens that focuses the light so as to form an image on the image sensor. The optical system may further include zoom lenses, micro lens arrays, and other optical elements as well known in the art. For example, a digital camera may be provided with an image sensor 110 and an optical system. As another example, a smart phone may be provided with an image sensor 110 and an optical system. As another example, a personal computer may be provided with an image sensor 110 and an optical system.

Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. An image sensor, comprising:
a pixel array including bright pixels and optical dark pixels;
a noise correction circuit including:
a defective pixel detection and correction circuit configured to
perform a defective pixel detection operation for detecting one or more defective optical dark pixels in a group of the optical dark pixels, and
responsive to performing the defective pixel detection operation, modify pixel data for the group of the optical dark pixels based on a detection of the one or more defective optical dark pixels,
an averaging circuit configured to determine an average of the pixel data that is modified, and
an adder configured to subtract the average of the pixel data that is modified from a pixel value of each of the bright pixels in a second group corresponding to the group of the optical dark pixels,
wherein the group of the optical dark pixels is a subset of the optical dark pixels, and
wherein the second group is a subset of the bright pixels.

2. The image sensor of claim 1,
wherein modifying the pixel data for the group of the optical dark pixels based on the detection of the one or more defective optical dark pixels further includes removing one or more pixel values of the one or more defective optical dark pixels from the pixel data for the group of the optical dark pixels.

3. The image sensor of claim 1,
wherein modifying the pixel data for the group of the optical dark pixels based on the detection of the one or more defective optical dark pixels further includes correcting one or more pixel values of the one or more defective optical dark pixels in the pixel data for the group of the optical dark pixels.

4. The image sensor of claim 3,
wherein correcting the one or more pixels values of the one or more defective optical dark pixels further includes
calculating a neighborhood-mean among pixel values from a predetermined number of optical dark pixels neighboring the one or more defective optical dark pixels, and
substituting the neighborhood-mean for the one or more pixel values of the one or more defective optical dark pixels in the pixel data for the group of the optical dark pixels.

5. The image sensor of claim 3,
wherein correcting the one or more pixel values of the one or more defective optical dark pixels further includes
calculating a neighborhood-median among pixel values from a predetermined number of optical dark pixels neighboring the one or more defective optical dark pixels, and
substituting the neighborhood-median for the one or more pixel values of the one or more defective optical dark pixels in the pixel data for the group of the optical dark pixels.

6. The image sensor of claim 1,
wherein, to perform the defective pixel detection operation, the defective pixel detection and correction circuit is further configured to detect the one or more defective optical dark pixels by determining whether any of the optical dark pixels in the group of the optical dark pixels has one of the top MH pixel values or one of the bottom ML pixel values in the pixel data for the group of the optical dark pixels, where MH and ML are predetermined values.

7. The image sensor of claim 1,
wherein, to perform the defective pixel detection operation, the defective pixel detection and correction circuit is further configured to detect the one or more defective optical dark pixels by determining whether any of the optical dark pixels in the group of the optical dark pixels has a pixel value outside of a predetermined range.

8. The image sensor of claim 1,
wherein, to perform the defective pixel detection operation, the defective pixel detection and correction circuit is further configured to detect the one or more defective optical dark pixels by determining whether any of the optical dark pixels in the group of the optical dark pixels has at least a predetermined number of neighboring optical dark pixels that are defective.

9. The image sensor of claim 1,
wherein the subset of the optical dark pixels is included in one row of a plurality of rows of the pixel array,
wherein the subset of the bright pixels corresponding to the subset of the optical dark pixels is included in the one row of the plurality of rows of the pixel array, and
wherein pixel values of the subset of the optical dark pixels and pixel values of the subset of the bright pixels are simultaneously read out from the pixel array.

10. The image sensor of claim 1,
wherein the subset of the optical dark pixels is included in one column of a plurality of columns of the pixel array,
wherein the subset of the bright pixels corresponding to the subset of the optical dark pixels is included in the one column of the plurality of columns of the pixel array, and
wherein pixel values of the subset of the optical dark pixels and pixel values of the subset of the bright pixels are read out from the pixel array with a same analog-to-digital converter.

11. The image sensor of claim 1,
wherein the noise correction circuit is further configured to perform a calibration operation prior to an imaging operation, the calibration operation includes performing the defective pixel detection operation, modifying the pixel data for the group of the optical dark pixels based on the detection of the one or more defective optical dark pixels, and computing the average of the pixel data that is modified.

12. The image sensor of claim 1,
wherein the noise correction circuit is further configured to perform a calibration and correction operation on each image frame, the calibration and correction operation includes performing the defective pixel detection operation, modifying the pixel data for the group of the optical dark pixels based on the detection of the one or more defective optical dark pixels, computing the average of the pixel data that is modified, and subtracting the average from the pixel value of the each of the bright pixels in the second group corresponding to the group of the optical dark pixels.

13. The image sensor of claim 1,
wherein an offset value is added to each pixel value that is output by the adder.

14. A non-transitory computer readable medium having program code stored thereon, executable by a processor to cause the processor to become a noise correction device for performing operations comprising:
- performing a defective pixel detection operation for detecting one or more defective calibration pixels in a group of calibration pixels included in a pixel array,
- modifying pixel data for the group of calibration pixels based on a detection of the one or more defective calibration pixels in response to performing the defective pixel detection operation,
- computing an average of the pixel data that is modified, and
- subtracting the average of the pixel data that is modified from a pixel value of each bright pixel in a group of bright pixels corresponding to the group of calibration pixels,
- wherein the group of calibration pixels is a subset of calibration pixels included in the pixel array, and
- wherein the group of bright pixels is a subset of bright pixels included in the pixel array.

15. The non-transitory computer readable medium of claim 14,
- wherein the one or more defective calibration pixels are detected as defective based on one or more pixel values of the one or more defective calibration pixels being in the top MH pixel values or in the bottom ML pixel values in the pixel data for the group of calibration pixels, where MH and ML are predetermined values.

16. The non-transitory computer readable medium of claim 14,
- wherein the one or more defective calibration pixels are detected as defective based on one or more pixel values of the one or more defective calibration pixels being outside of a predetermined range.

17. The non-transitory computer readable medium of claim 14,
- wherein modifying the pixel data for the group of calibration pixels based on the detection of the one or more defective calibration pixels further includes removing one or more pixel values of the one or more defective calibration pixels from the pixel data.

18. The non-transitory computer readable medium of claim 14,
- wherein modifying the pixel data for the group of calibration pixels based on the detection of the one or more defective calibration pixels further includes correcting one or more pixel values of the one or more defective calibration pixels in the pixel data for the group of calibration pixels.

19. The non-transitory computer readable medium of claim 14, wherein the operations further comprise:
- performing a calibration operation prior to an imaging operation, the calibration operation further includes performing the defective pixel detection operation, modifying the pixel data for the group of calibration pixels based on the detection of the one or more defective calibration pixels, and computing the average of the pixel data that is modified.

20. The non-transitory computer readable medium of claim 14, wherein the operations further comprise:
- performing a calibration and correction operation each image frame, the calibration and correction operation further includes performing the defective pixel detection operation, modifying the pixel data for the group of calibration pixels based on the detection of the one or more defective calibration pixels, computing the average of the pixel data that is modified, and subtracting the average from the pixel value of the each bright pixel in the group of bright pixels corresponding to the group of calibration pixels.

21. The non-transitory computer readable medium of claim 14, wherein the operations further comprise:
- adding an offset value to the pixel value of the each bright pixel in the group of bright pixels corresponding to the group of calibration pixels.

22. A method comprising:
- detecting one or more defective calibration pixels in a group of calibration pixels included in a pixel array,
- modifying pixel data for the group of calibration pixels based on a detection of the one or more defective calibration pixels in response to detecting the one or more defective calibration pixels,
- computing an average of the pixel data that is modified, and
- subtracting the average from a pixel value of each bright pixel in a group of bright pixels included in the pixel array, the group of bright pixels corresponding to the group of calibration pixels,
- wherein the group of calibration pixels is a subset of calibration pixels included in the pixel array, and
- wherein the group of bright pixels is a subset of bright pixels included in the pixel array.

* * * * *